US012684168B2

(12) United States Patent
Yang et al.

(10) Patent No.: US 12,684,168 B2
(45) Date of Patent: Jul. 14, 2026

(54) POINT CLOUD CODING METHOD

(71) Applicant: GUANGDONG OPPO MOBILE TELECOMMUNICATIONS CORP., LTD., Dongguan (CN)

(72) Inventors: Fuzheng Yang, Dongguan (CN); Junyan Huo, Dongguan (CN); Yanzhuo Ma, Dongguan (CN); Ming Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 12 days.

(21) Appl. No.: 19/010,671

(22) Filed: Jan. 6, 2025

(65) Prior Publication Data

US 2025/0142122 A1    May 1, 2025

Related U.S. Application Data

(63) Continuation of application No. PCT/CN2022/117330, filed on Sep. 6, 2022.

(30) Foreign Application Priority Data

Jul. 13, 2022    (WO) ................ PCT/CN2022/105576

(51) Int. Cl.
*H01L 29/94* (2006.01)
*H04N 19/105* (2014.01)
(Continued)

(52) U.S. Cl.
CPC ......... *H04N 19/597* (2014.11); *H04N 19/105* (2014.11); *H04N 19/127* (2014.11)

(58) Field of Classification Search
CPC .. H04N 19/597; H04N 19/105; H04N 19/127; H04N 19/136; H04N 19/50;
(Continued)

(56) References Cited

U.S. PATENT DOCUMENTS

| | | | |
|---|---|---|---|
| 2003/0108099 A1* | 6/2003 | Nagumo .................. | G06T 9/20 |
| | | | 375/E7.199 |
| 2005/0053294 A1* | 3/2005 | Mukerjee .............. | H04N 19/51 |
| | | | 375/E7.125 |

(Continued)

FOREIGN PATENT DOCUMENTS

| | | |
|---|---|---|
| CN | 113014903 A | 6/2021 |
| CN | 113256746 A | 8/2021 |

(Continued)

OTHER PUBLICATIONS

WIPO, International Search Report and Written Opinion for International Application No. PCT/CN2022/117330, Mar. 12, 2023. 14 pages (with English translation).

(Continued)

*Primary Examiner* — Joseph Suh
(74) *Attorney, Agent, or Firm* — Sheppard, Mullin, Richter & Hampton LLP

(57) ABSTRACT

A point cloud decoding method is applied to a decoder and includes the following. Reconstructed attribute information of occupied neighbouring nodes of a current node and reconstructed attribute information of occupied same-level neighbouring child nodes of a child node of the current node are determined. An attribute prediction value of the child node of the current node is determined according to the reconstructed attribute information of the occupied neighbouring nodes and the reconstructed attribute information of the occupied same-level neighbouring child nodes of the child node of the current node. A first transformed coefficient is determined by performing region adaptive hierarchal transform (RAHT) on the attribute prediction value, and reconstructed attribute information of the child node of the current node is determined according to the first transformed coefficient.

20 Claims, 11 Drawing Sheets

(51) Int. Cl.
    *H04N 19/127*        (2014.01)
    *H04N 19/597*        (2014.01)

(58) Field of Classification Search
    CPC ...... H04N 19/52; H04N 19/593; H04N 19/96;
                                         G06T 9/40
    See application file for complete search history.

(56) References Cited

U.S. PATENT DOCUMENTS

| | | | | |
|---|---|---|---|---|
| 2006/0126962 A1* | 6/2006 | Sun | .................... | H04N 19/895 |
| | | | | 382/268 |
| 2019/0311502 A1* | 10/2019 | Mammou | ........... | G06F 16/9027 |
| 2020/0021856 A1* | 1/2020 | Tourapis | ................ | H04N 19/13 |
| 2020/0302651 A1 | 9/2020 | Flynn et al. | | |
| 2021/0248784 A1* | 8/2021 | Gao | ....................... | H04N 19/96 |

| | | | | |
|---|---|---|---|---|
| 2022/0114766 A1 | 4/2022 | Sugio et al. | | |
| 2022/0191545 A1 | 6/2022 | Sugio et al. | | |
| 2022/0232253 A1* | 7/2022 | Gao | .................... | H04N 19/119 |

FOREIGN PATENT DOCUMENTS

| | | | | |
|---|---|---|---|---|
| CN | 113473127 A | 10/2021 | | |
| CN | 113473153 A | 10/2021 | | |
| CN | 113676738 A | 11/2021 | | |
| CN | 114531950 A | 5/2022 | | |
| WO | WO-2021066160 A1 * | 4/2021 | ........... | H04N 19/597 |
| WO | 2022116117 A1 | 6/2022 | | |

OTHER PUBLICATIONS

WIPO, International Search Report and Written Opinion for International Application No. PCT/CN2022/105576, Mar. 16, 2023. 14 pages (with English translation).

* cited by examiner

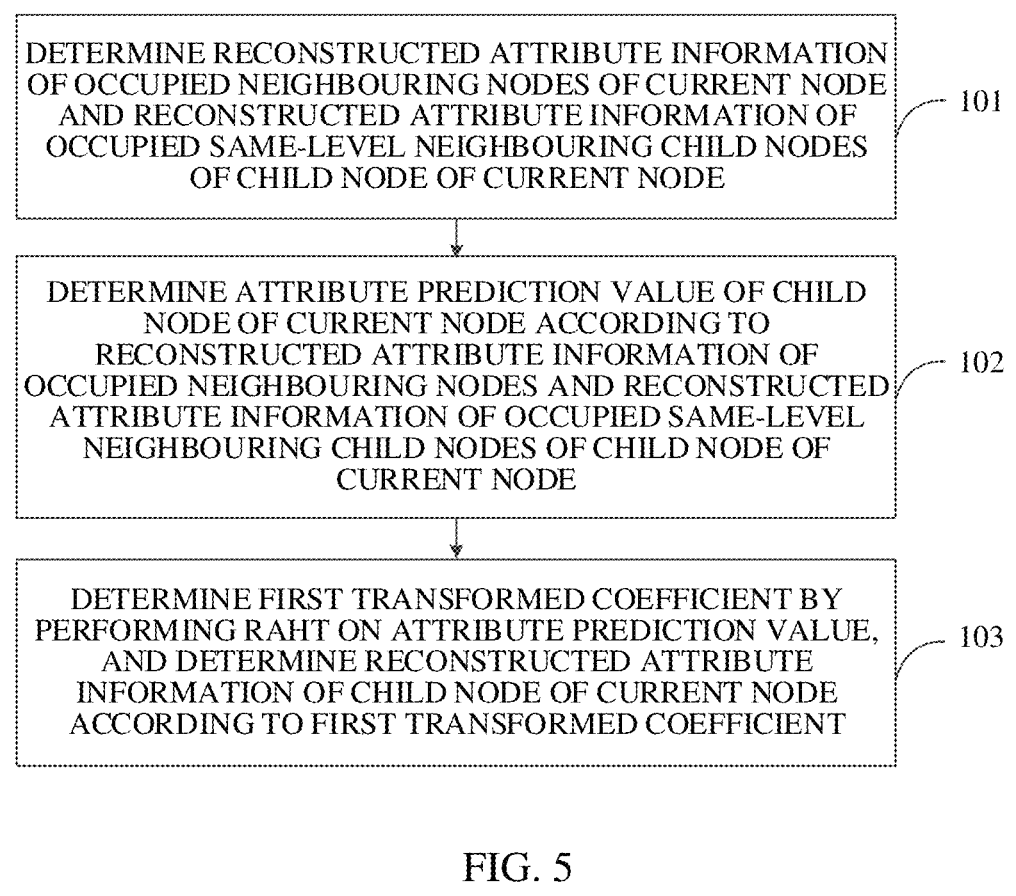

DETERMINE RECONSTRUCTED ATTRIBUTE INFORMATION
OF OCCUPIED NEIGHBOURING NODES OF CURRENT NODE
AND RECONSTRUCTED ATTRIBUTE INFORMATION OF
OCCUPIED SAME-LEVEL NEIGHBOURING CHILD NODES
OF CHILD NODE OF CURRENT NODE ⟋ 101

DETERMINE ATTRIBUTE PREDICTION VALUE OF CHILD
NODE OF CURRENT NODE ACCORDING TO
RECONSTRUCTED ATTRIBUTE INFORMATION OF
OCCUPIED NEIGHBOURING NODES AND RECONSTRUCTED
ATTRIBUTE INFORMATION OF OCCUPIED SAME-LEVEL
NEIGHBOURING CHILD NODES OF CHILD NODE OF
CURRENT NODE ⟋ 102

DETERMINE FIRST TRANSFORMED COEFFICIENT BY
PERFORMING RAHT ON ATTRIBUTE PREDICTION VALUE,
AND DETERMINE RECONSTRUCTED ATTRIBUTE
INFORMATION OF CHILD NODE OF CURRENT NODE
ACCORDING TO FIRST TRANSFORMED COEFFICIENT ⟋ 103

FIG. 5

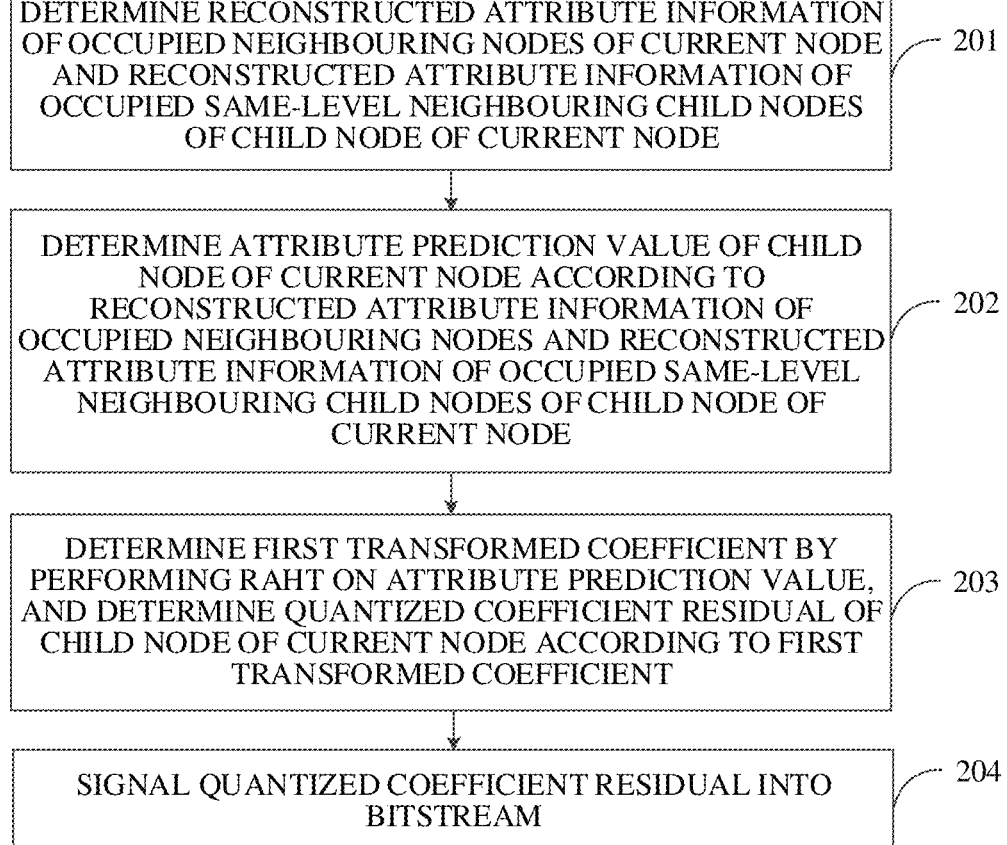

DETERMINE RECONSTRUCTED ATTRIBUTE INFORMATION OF OCCUPIED NEIGHBOURING NODES OF CURRENT NODE AND RECONSTRUCTED ATTRIBUTE INFORMATION OF OCCUPIED SAME-LEVEL NEIGHBOURING CHILD NODES OF CHILD NODE OF CURRENT NODE ⟋ 201

DETERMINE ATTRIBUTE PREDICTION VALUE OF CHILD NODE OF CURRENT NODE ACCORDING TO RECONSTRUCTED ATTRIBUTE INFORMATION OF OCCUPIED NEIGHBOURING NODES AND RECONSTRUCTED ATTRIBUTE INFORMATION OF OCCUPIED SAME-LEVEL NEIGHBOURING CHILD NODES OF CHILD NODE OF CURRENT NODE ⟋ 202

DETERMINE FIRST TRANSFORMED COEFFICIENT BY PERFORMING RAHT ON ATTRIBUTE PREDICTION VALUE, AND DETERMINE QUANTIZED COEFFICIENT RESIDUAL OF CHILD NODE OF CURRENT NODE ACCORDING TO FIRST TRANSFORMED COEFFICIENT ⟋ 203

SIGNAL QUANTIZED COEFFICIENT RESIDUAL INTO BITSTREAM ⟋ 204

FIG. 6

POINT CLOUD CODING METHOD

CROSS-REFERENCE TO RELATED APPLICATION(S)

This application is a continuation of International Application No. PCT/CN2022/117330, filed Sep. 6, 2022, which claims priority to International Application No. PCT/CN2022/105576, filed Jul. 13, 2022, the entire disclosures of which are incorporated herein by reference.

TECHNICAL FIELD

Embodiments of the disclosure relate to the technical field of video coding, and in particular, to a point cloud coding method.

BACKGROUND

In a geometry-based point cloud compression (G-PCC) framework provided by the moving picture experts group (MPEG), geometry information of the point cloud and attribute information corresponding to each point cloud are encoded separately. After encoding of the geometry information is completed, the geometry information is reconstructed. Encoding of the attribute information will depend on the reconstructed geometry information.

Currently, MPEG G-PCC mainly uses two attribute transform encoding branches, namely, a region adaptive hierarchal transform (RAHT) branch and a lifting transform branch. In order to remove spatial redundancy and improve video compression performance, upsampled prediction is introduced in RAHT.

During upsampled prediction, a current node is mainly predicted by using an encoded parent node at a previous level and neighbours of the parent node, without considering spatial conditions of the current node in the point cloud, so that the encoding efficiency is low.

SUMMARY

In a first aspect, a point cloud decoding method is provided in embodiments of the disclosure. The method is applied to a decoder and includes the following. Reconstructed attribute information of occupied neighbouring nodes of a current node and reconstructed attribute information of occupied same-level neighbouring child nodes of a child node of the current node are determined. An attribute prediction value of the child node of the current node is determined according to the reconstructed attribute information of the occupied neighbouring nodes and the reconstructed attribute information of the occupied same-level neighbouring child nodes of the child node of the current node. A first transformed coefficient is determined by performing region adaptive hierarchal transform (RAHT) on the attribute prediction value, and reconstructed attribute information of the child node of the current node is determined according to the first transformed coefficient.

In a second aspect, a point cloud decoding method is provided in embodiments of the disclosure. The method is applied to a decoder and includes the following. If a current node is not a root node, the number of occupied neighbours of a parent node of the current node and the number of occupied neighbours of the current node are determined. If the number of the occupied neighbours of the parent node is greater than or equal to a first threshold and the number of the occupied neighbours of the current node is greater than or equal to a second threshold, reconstructed attribute information of occupied neighbouring nodes of the current node and reconstructed attribute information of occupied same-level neighbouring child nodes of a child node of the current node are determined. An attribute prediction value of the child node of the current node is determined according to the reconstructed attribute information of the occupied neighbouring nodes and the reconstructed attribute information of the occupied same-level neighbouring child nodes of the child node of the current node. A first transformed coefficient is determined by performing RAHT on the attribute prediction value, and reconstructed attribute information of the child node of the current node is determined according to the first transformed coefficient.

In a third aspect, a point cloud encoding method is provided in embodiments of the disclosure. The method is applied to an encoder and includes the following. Reconstructed attribute information of occupied neighbouring nodes of a current node and reconstructed attribute information of occupied same-level neighbouring child nodes of a child node of the current node are determined. An attribute prediction value of the child node of the current node is determined according to the reconstructed attribute information of the occupied neighbouring nodes and the reconstructed attribute information of the occupied same-level neighbouring child nodes of the child node of the current node. A first transformed coefficient is determined by performing RAHT on the attribute prediction value, and a coefficient residual value of the child node of the current node is determined according to the first transformed coefficient. The coefficient residual value is signalled into a bitstream.

BRIEF DESCRIPTION OF THE DRAWINGS

FIG. 5 is a schematic diagram of an implementation process of a point cloud decoding method provided in embodiments of the disclosure.

FIG. 6 is a schematic diagram of an implementation process of a point cloud encoding method provided in embodiments of the disclosure.

DETAILED DESCRIPTION

Figure 1:
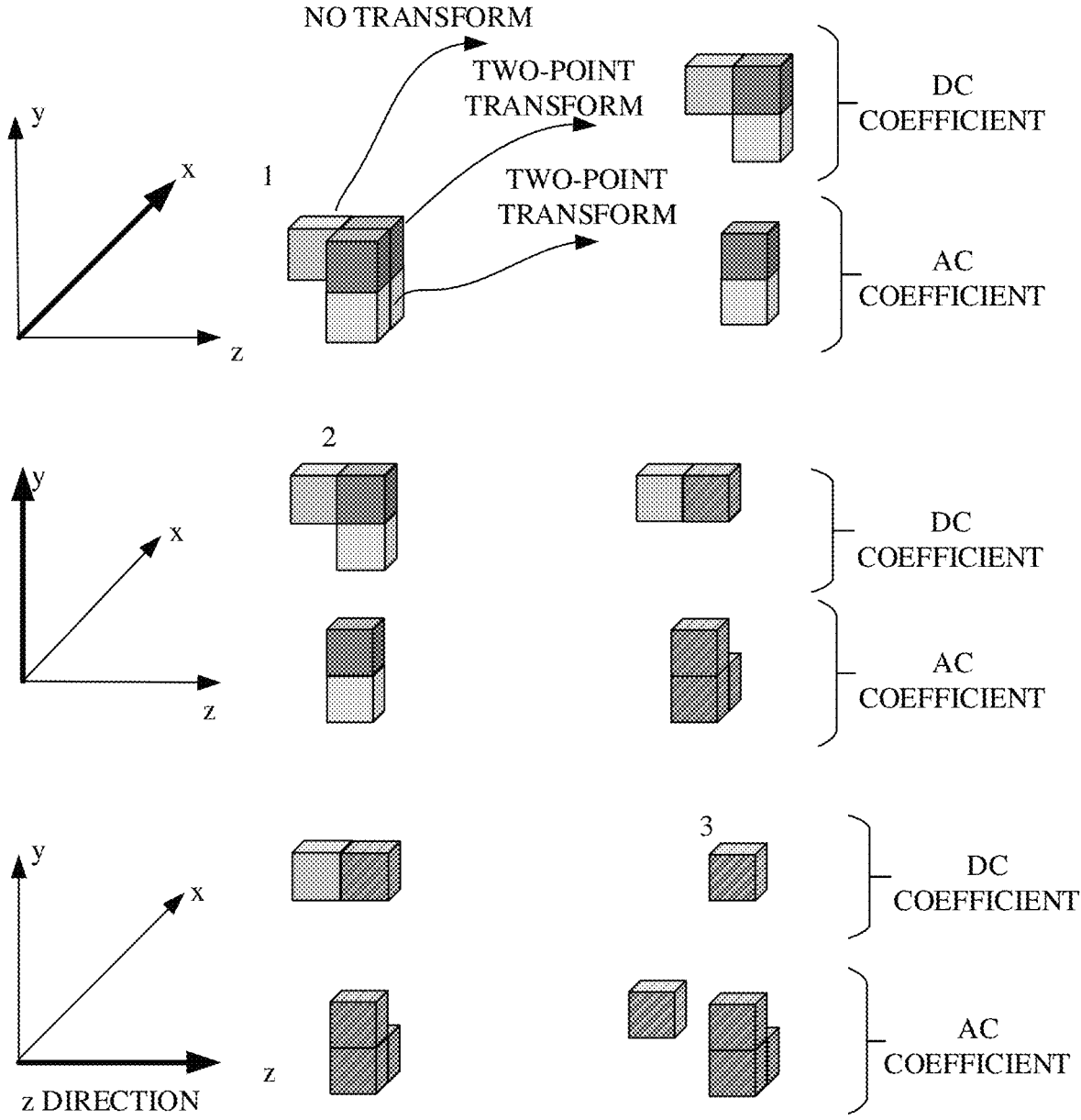
FIG. 1 is a schematic diagram of region adaptive hierarchal transform (RAHT).

To enable a more detailed understanding of features and technical content in embodiments of the disclosure, the embodiments of the disclosure will be described in detail below in conjunction with the accompanying drawings, which are provided for illustrative purposes only and are not intended to limit embodiments of the disclosure.

Unless otherwise defined, all technical and scientific terms used herein have the same meaning as commonly understood by those skilled in the art. The terms used herein are for the purpose of describing embodiments of the disclosure only and are not intended to limit the disclosure.

In the following description, reference to "some embodiments" describes a subset of all possible embodiments, but it will be understood that "some embodiments" may refer to the same or different subsets of all possible embodiments and may be combined with each other without conflict.

It may be noted that the terms "first/second/third" in embodiments of the disclosure are merely for distinguishing similar objects and do not imply a particular ordering with respect to the objects, and it will be understood that "first/second/third" may, where appropriate, be interchanged in a particular order or sequence so that embodiments of the disclosure described herein can be implemented in an order other than that illustrated or described herein.

Here, a point cloud is a three-dimensional (3D) representation of the surface of an object. The point cloud (data) of the surface of the object can be captured by means of a capturing equipment such as a photo radar, a LIDAR, a laser scanner, and a multi-view camera.

The point cloud is a large collection of 3D points. A point in the point cloud may include both position information and attribute information of the point. For example, the position information of the point may be 3D coordinate information of the point. The position information of the point may also be referred to as geometry information of the point. For example, the attribute information of the point may include colour information and/or reflectance information, etc. For example, the colour information may be information on any colour space. For example, the colour information may be RGB information, where R represents red, G represents green, and B represents blue. Another example of the colour information may be luminance-chrominance (YCbCr, YUV) information, where Y represents brightness (Luma), Cb (U) represents blue chrominance, and Cr (V) represents red chrominance.

For a point cloud obtained based on laser measurement, a point in the point cloud may include 3D coordinate information of the point and laser reflectance of the point. For a point cloud obtained based on photogrammetry, a point in the point cloud may include 3D coordinate information of the point and colour information of the point. For a point cloud obtained based on laser measurement and photogrammetry, a point in the point cloud may include the 3D coordinate information of the point, the laser reflectance of the point, and the colour information of the point.

Point clouds may be classified according to the obtaining manners as:

a first-type static point cloud: the object is stationary and the point cloud obtaining device is also stationary;

a second-type dynamic point cloud: the object is in motion, but the point cloud obtaining device is stationary; and a third-type dynamically-obtained point cloud: the object is in motion, and the point cloud obtaining device is also in motion.

For example, point clouds may be classified into two main categories according to usage:

category 1: machine perception point cloud, which may be used in scenarios such as autonomous navigation systems, real-time inspection systems, geographic information systems, visual sorting robots, and rescue and disaster relief robots; and category 2: human eye perception point cloud, which may be used in scenarios such as digital cultural heritage, free point-of-view broadcasting, 3D immersive communication, and 3D immersive interaction.

As the point cloud is a collection of massive amounts of points, storing the point cloud not only consumes a lot of memory, but is also not conducive to transmission. Also, there is no such large bandwidth available to support the transmission of the point cloud directly across the network layer without compression. Therefore, the point cloud needs to be compressed.

As of today, point cloud coding frameworks that can compress the point cloud are either the geometry-based point cloud compression (G-PCC) codec framework or the video point cloud compression (V-PCC) codec framework provided by the moving picture experts group (MPEG), or the audio video standard (AVS)-PCC codec framework provided by the AVS. The G-PCC codec framework may be used for compression of the first-type static point cloud and the third-type dynamically-obtained point cloud, and the V-PCC codec framework may be used for compression of the second-type dynamic point cloud. The G-PCC codec framework is also known as the point cloud codec TMC13, and the V-PCC codec framework is also known as the point cloud codec TMC2.

It may be understood that in the G-PCC encoder framework, an input point cloud is partitioned into slices and then the slices are encoded independently. In a slice, the geometry information and the attribute information of the point cloud are encoded separately. The G-PCC encoder first encodes the geometry information. The encoder performs coordinate transform on the geometry information such that the whole point cloud is contained in a bounding box. This is followed by quantization, which is mainly a scaling process. Due to rounding in the quantization, some of the points have the same geometry information. Whether to remove duplicate points is determined according to parameters. Compression without removing duplicate points is referred to as geometry lossless compression, compression with removing duplicate points is referred to as geometry lossy compression, and the process of quantizing and removing the duplicate points is also called voxelization. Next, multi-tree (for example, octree, quadtree, binary tree) partitioning is performed on the bounding box. Depending on the depth of the multi-tree partitioning, encoding of the geometry information may be based on two frameworks, namely a multi-tree based framework and a prediction-tree based framework.

In the multi-tree based framework for geometry information encoding, the bounding box is equally partitioned into multiple sub-cubes and occupancy bits of the sub-cubes are recorded (where 1 represents non-empty and 0 represents empty). The non-empty sub-cubes are continued to be equally partitioned, generally until a resulting leaf node is a 1×1×1 unit cube. In this process, spatial correlation between a node and the surrounding nodes is used for intra prediction of the occupancy bits, and finally arithmetic encoding (CABAC) is performed to generate a binary geometry bitstream, i.e., the geometry bitstream.

After completing encoding of the geometry information, the G-PCC encoder reconstructs the geometry information and uses the reconstructed geometry information to encode the attribute information of the point cloud. In the multi-tree based framework for geometry information encoding, both geometry lossless compression and geometry lossy compression undergo a geometry reconstruction process upon completion of the multi-tree partitioning. Currently, attribute encoding of the point cloud is focused on encoding of the colour information of the points in the point cloud. First, the encoder may perform colour space transform on the point colour information. For example, when the colour information of the points in the input point cloud is represented using the RGB colour space, the encoder may transform the colour information from the RGB colour space to the YUV colour space. The reconstructed geometry information is then used to recolour the point cloud, so that the uncoded attribute information can correspond to the reconstructed geometry information. There are two main transform methods for encoding of the colour information. One is lifting transform that relies on level of detail (LOD) partitioning, and the other is direct region adaptive hierarchal transform (RAHT), both of which transform the colour information from the spatial domain to the frequency domain to obtain high-frequency coefficients and low-frequency coefficients, and finally quantize and arithmetically encode the coefficients to generate a binary attribute bitstream, i.e., the attribute bitstream.

It may be noted that, for the attribute information, whether to perform colour space transform on the input attribute information may be first determined, and the TMC13 platform currently supports to transform colour attributes from the RGB space to the YUV space. In case of geometry losses, the point cloud is recoloured, and then an appropriate encoding mode is selected according to different test sequences and conditions. Currently, MPEG G-PCC uses two attribute transform encoding branches, namely, an RAHT branch and a lifting transform branch.

RAHT is performed based on a hierarchical structure which is obtained by performing octree partitioning on the point cloud data. From a root node of the octree, the transform is performed hierarchically from the top to the bottom. A transform unit is a 2×2×2 block, and a transform order within this block is from the bottom to the top. FIG. 1 is a schematic diagram of RAHT. As illustrated in FIG. 1, voxel block 1 is obtained after the octree partitioning is completed (that is, the geometry with three alternating colour depths in FIG. 1, where each square represents a point in the point cloud). RAHT is performed from the top layer, and as an example, the transform order is the xyz order. As illustrated in FIG. 1, RAHT is performed first in the x direction. If there are neighbouring voxel blocks in the x direction, RAHT is performed on them, to obtain the weighted average (DC coefficient) and residual (AC coefficient) of attribute values of the two neighbouring points. The obtained DC coefficient exists as attribute information of voxel block 2 of the parent node and RAHT is performed at the next layer, while RAHT is also performed at the next layer for the AC coefficient. If there is no neighbouring point, the attribute value of this voxel block is directly transferred to the parent node at the second layer. At the second layer, RAHT is performed in the y direction. if there are neighbouring voxel blocks in the y direction, RAHT is performed on them, to obtain the weighted average (DC coefficient) and residual (AC coefficient) of the attribute values of the two neighbouring points. Thereafter, at the third layer, RAHT is performed in the z direction, voxel block 3 of the parent node with three alternating colour depths is obtained as the parent node at the next layer in the octree, and the AC coefficient is kept and used in the final encoding. Repeat RAHT in the x, y, and z directions until there is only one parent node in the entire point cloud.

In practice, when the points in the point cloud are traversed, the sorted Morton code of the point cloud is used.

That is, whether two child nodes are under a same parent node are determined according to whether values after the Morton code is shifted by one bit to the right are equal.

In order to remove spatial redundancy, upsampled prediction is introduced in RAHT, which brings huge performance gains. For the upsampled prediction, the whole prediction process may be divided into two steps. First, neighbour search is performed, and then weighted prediction is performed according to a reconstructed value of a found neighbouring node.

For the neighbour search, the number of neighbours of a parent node of a current point is determined first. If the number of neighbours is less than a set threshold (e.g., predictionThreshold[1]=2), RAHT is directly performed on original attribute information of the current point without neighbour search and weighted prediction, and then the AC coefficient is quantized and entropy-encoded. Otherwise, neighbour search is performed.

Figure 2:
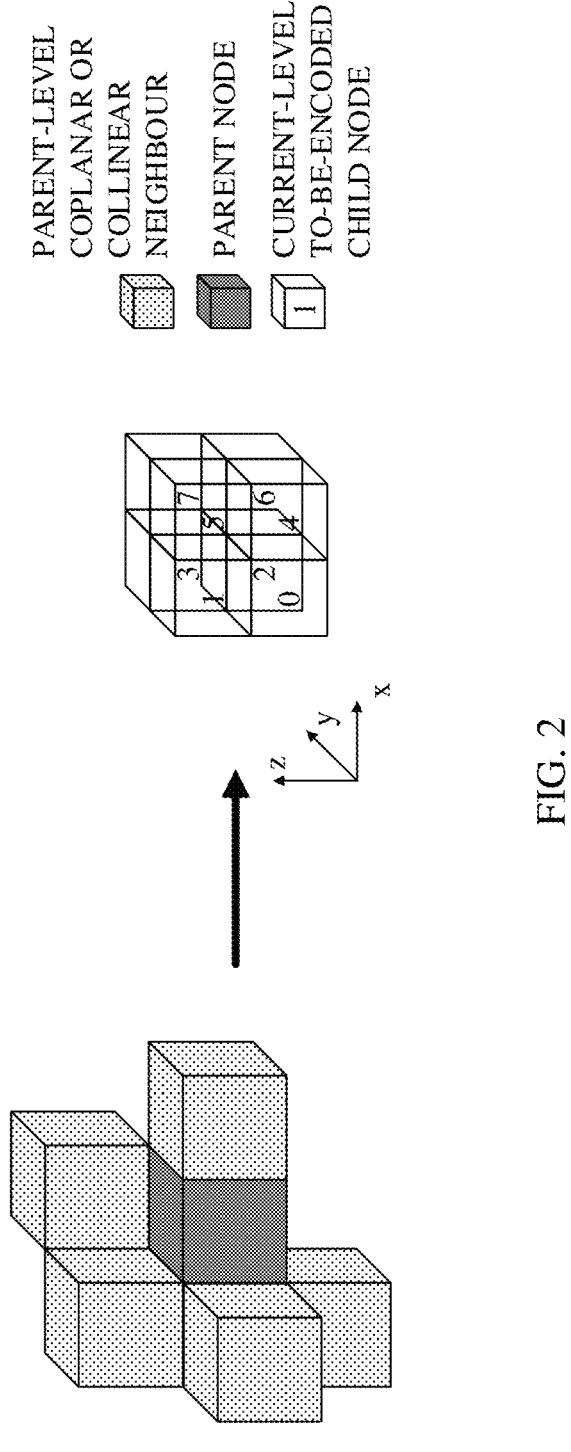
FIG. 2 is a schematic diagram of parent-level neighbours.

Second, the neighbours of the parent node are searched, and the search range includes the parent node of the current point, a coplanar neighbour of the current parent node, and a collinear neighbour of the current parent node. FIG. 2 is a schematic diagram of parent-level neighbours, as illustrated in FIG. 2. If a neighbour of a parent node is occupied, reconstructed attribute information of the neighbour is recorded.

The number of found neighbours of the parent node (including the current parent node itself) is counted. If the number of the neighbours of the parent node is less than a set threshold predictionThreshold[1]=6, RAHT is directly performed on the original attribute information of the current point without weighted prediction, and then the AC coefficient is quantized and entropy-encoded. Otherwise, weighted prediction is performed.

For the weighted prediction, weighted prediction is performed on each child node of the current parent node, and an alternative reference-point-set corresponding to the child node includes neighbouring nodes obtained in the neighbour search. It is specified that a prediction weight of the current parent node is 4, a prediction weight of the coplanar neighbour of the parent node is 2, and a prediction weight of the collinear neighbour of the parent node is 1.

The current parent node can be used to predict each child node in the current parent node, and whether neighbours of the parent node satisfy a condition of being coplanar or collinear with a current child node needs to be further determined. If a neighbour of the parent node does not satisfy the condition, the neighbour of the parent node cannot be used to perform weighted prediction on the current child node. If a neighbour of the parent node satisfies the condition, the neighbour of the parent node can be used to predict the current child node.

Prediction thresholds lim i tLow and lim i tHigh are respectively set according to an attribute value attrpar of the current parent node, as illustrated in the following formula.

$$limitLow = attrpar \times 2 \tag{1}$$

$$limitHigh = attrpar \times 25 \tag{2}$$

Assuming that an attribute value of a neighbour of the current parent node is attrnei, if lim i tLow<10×attrnei<lim i tHigh, then the neighbour may be added to a reference neighbouring point set of the current child node. Otherwise, this neighbouring node is not used for prediction.

In a point cloud G-PCC decoder framework, a geometry bitstream of the point cloud is decoded separately from an attribute bitstream of the point cloud. A G-PCC decoder decodes the geometry bitstream. The decoder performs arithmetic decoding on the geometry bitstream, to obtain the bounding box and the multi-tree based occupancy bits (where 1 represents non-empty and 0 represents empty) of the point cloud. Depending on the depth of the multi-tree partitioning during encoding, decoding of the geometry information may be based on two frameworks, namely a multi-tree based framework and a prediction-tree based framework.

Figure 3:
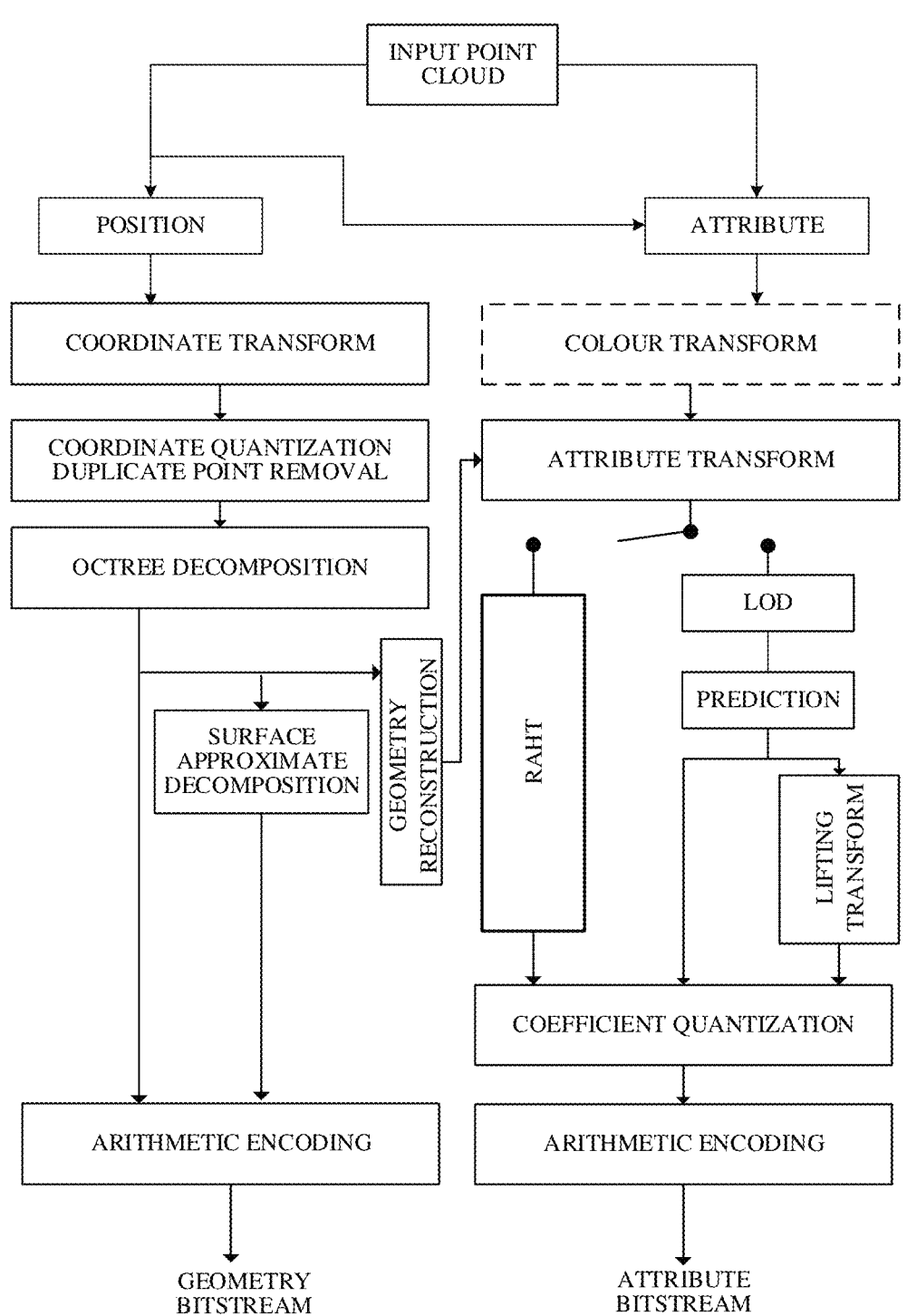
FIG. 3 is a schematic diagram of a framework of a geometry-based point cloud compression (G-PCC) encoder.

FIG. 3 is a schematic diagram of a framework of a G-PCC encoder. As illustrated in the schematic diagram of the framework of the G-PCC encoder of FIG. 3, it is applied to a point cloud encoder. For to-be-encoded point cloud data, through slice partitioning, the point cloud data is first partitioned into multiple slices. In each slice, geometry information and attribute information of the point cloud are encoded separately. During encoding of the geometry information, coordinate transform is performed on the geometry information such that the whole point cloud is contained in a bounding box. This is followed by quantization, which is mainly a scaling process. Due to rounding in the quantization, the geometry information of part of the point cloud is the same, and thus whether to remove duplicate points is determined based on parameters. The process of quantizing and removing the duplicate points is also called the voxelization. Next, multi-tree partitioning is performed on the bounding box. During encoding of the geometry information based on multi-tree, the bounding box is equally partitioned into multiple sub-cubes, and non-empty (including points in the point cloud) sub-cubes are continued to be equally partitioned until a resulting leaf node is 1×1×1 unit cube. Arithmetic encoding is performed on points in the leaf node, to generate a binary geometry bitstream, i.e., the geometry bitstream.

During encoding of the attribute information, after the encoding of the geometry information is completed and the geometry information is reconstructed, colour transform is performed, that is, colour information (i.e., the attribute information) is transformed from the RGB colour space to the YUV colour space. Thereafter, the reconstructed geometry information is used to recolour the point cloud, so that the uncoded attribute information can correspond to the reconstructed geometry information. The encoding of the attribute information mainly aims at encoding of the colour information. During the encoding of the colour information, there are mainly two transform methods. One method is lifting transform which relies on LOD partitioning, and the other method is direct RAHT, both of which transform the colour information from the spatial domain to the frequency domain to obtain high-frequency coefficients and low-frequency coefficients through transform, and finally quantize the coefficients (i.e., quantized coefficients). At last, after multi-tree partitioning and surface fitting, geometry encoding data and quantized coefficient processing attribute encoding data are slice-synthesized, and then vertex coordinates of each block are encoded in turn (i.e., arithmetic encoding), to generate a binary attribute bitstream, i.e., the attribute bitstream.

Figure 4:
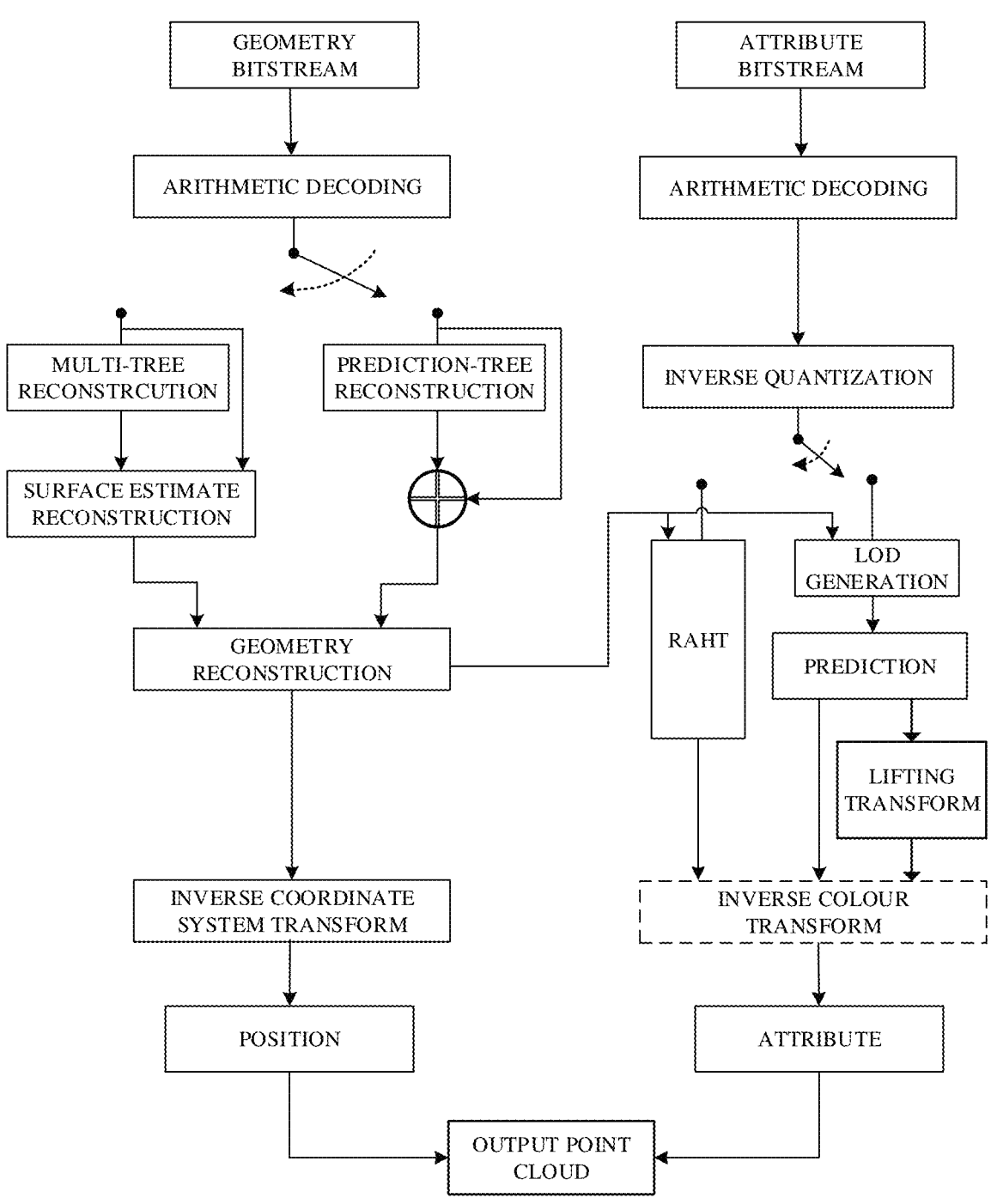
FIG. 4 is a schematic diagram of a framework of a G-PCC decoder.

FIG. 4 is a schematic diagram of a framework of a G-PCC decoder. As illustrated in FIG. 4, it is applied to a point cloud decoder. For the obtained binary bitstream, after the binary bitstream is obtained, the geometry bitstream and the attribute bitstream in the binary bitstream are decoded independently. When decoding the geometry bitstream, the geometry information of the point cloud is obtained through arithmetic decoding-multi-tree synthesis-surface fitting-geometry reconstruction-inverse coordinate transform. Here, after the surface fitting, geometry reconstruction may be performed, or scalable-geometry reconstruction may be performed, which mainly depends on whether the spatial scalability function is performed. In addition, when decoding the attribute bitstream, the attribute information of the point cloud is obtained through arithmetic decoding-inverse quantization-LOD-based inverse lifting or RAHT-based inverse transform-inverse colour transform. The three-dimensional image model of the to-be-encoded point cloud data is restored based on the geometry information and the attribute information.

Currently, in the upsampled prediction, the RAHT operation is performed layer by layer from the top to the bottom. During encoding of a current level, a current point is predicted by using an encoded parent node at a previous level and neighbours of the parent node. However, such an encoding method does not make full use of the spatial correlation, thereby losing the encoding efficiency.

To solve the above problem, in embodiments of the disclosure, a decoder determines reconstructed attribute information of occupied neighbouring nodes of a current node and reconstructed attribute information of occupied same-level neighbouring child nodes of a child node of the current node. The decoder determines an attribute prediction value of the child node of the current node according to the reconstructed attribute information of the occupied neighbouring nodes and the reconstructed attribute information of the occupied same-level neighbouring child nodes of the child node of the current node. The decoder determines a first transformed coefficient by performing RAHT on the attribute prediction value, and determines reconstructed attribute information of the child node of the current node according to the first transformed coefficient. An encoder determines reconstructed attribute information of occupied neighbouring nodes of a current node and reconstructed attribute information of occupied same-level neighbouring child nodes of a child node of the current node. The encoder determines an attribute prediction value of the child node of the current node according to the reconstructed attribute information of the occupied neighbouring nodes and the reconstructed attribute information of the occupied same-level neighbouring child nodes of the child node of the current node. The encoder determines a first transformed coefficient by performing RAHT on the attribute prediction value, and determines a quantized coefficient residual of the child node of the current node according to the first transformed coefficient. The encoder signals the quantized coefficient residual into a bitstream. That is to say, in embodiments of the disclosure, for the RAHT process, during prediction of attribute information of the current node, the reconstructed attribute information of the occupied neighbouring nodes of the current node and the reconstructed attribute information of the occupied same-level neighbouring child nodes of the child node of the current node can be used to determine the attribute prediction value of the child node of the current node. In other words, on the basis of upsampled prediction, same-level neighbouring nodes of the current node and same-level neighbouring child nodes of the child node are introduced for prediction of the attribute information, that is, parent-level neighbouring nodes and the same-level neighbouring child nodes of the child node of the current node are introduced for prediction of the attribute information. As such, the coding efficiency and the video compression performance can be improved.

That is to say, on the basis of upsampled prediction, a point cloud coding method proposed in embodiments of the disclosure introduces same-level neighbouring nodes for prediction, and thus the coding efficiency can be further improved.

A point cloud encoding method in embodiments of the disclosure can be applied to RAHT as illustrated in FIG. 3. In addition, a point cloud decoding method in embodiments of the disclosure can be applied to RAHT as illustrated in FIG. 4. In other words, the point cloud coding method in embodiments of the disclosure can be applied to an encoder or a decoder, or even to both the encoder and the decoder, which is not limited in embodiments of the disclosure.

The technical solutions in embodiments of the disclosure will be clearly and completely described below in conjunction with the accompanying drawings in embodiments of the disclosure.

A point cloud decoding method is provided in embodiments of the disclosure. FIG. 5 a schematic diagram of an implementation process of a point cloud decoding method provided in embodiments of the disclosure. As illustrated in FIG. 5, a method performed by a decoder for decoding a point cloud may include the following.

At 101, reconstructed attribute information of occupied neighbouring nodes of a current node and reconstructed attribute information of occupied same-level neighbouring child nodes of a child node of the current node are determined.

In embodiments of the disclosure, reconstructed attribute information of occupied neighbouring nodes of a current node may be first determined, and at the same time, reconstructed attribute information of occupied same-level neighbouring child nodes of a child node of the current node may be determined.

It may be understood that in embodiments of the disclosure, the current node may be a point in a to-be-decoded point cloud, and the current node may be a block with a transform unit of RAHT being 2×2×2. Accordingly, the child node of the current node may be a subblock in the block with the transform unit of RAHT being 2×2×2, and a parent node of the current node is a node at a previous level of the current node.

It may be understood that in embodiments of the disclosure, at a decoding end, an octree structure is constructed from the bottom to the top according to geometry information, and then parsing is performed layer by layer from a root node. The transform unit of RAHT is a 2×2×2 block, which is defined as a to-be-decoded node, i.e., the current node.

Further, in embodiments of the disclosure, if the current node is the root node, a bitstream is decoded to determine a quantized coefficient of the current node. A transformed coefficient is determined by performing inverse quantization on the quantized coefficient. Reconstructed attribute information of the current node is determined by performing inverse transform on the transformed coefficient.

It may be noted that in embodiments of the disclosure, if the current node is the root node, a corresponding transformed coefficient can be obtained by performing inverse quantization on a quantized coefficient decoded from a bitstream. Then, inverse transform is performed on the transformed coefficient, so that reconstructed attribute information of the current node can be determined.

Further, in embodiments of the disclosure, if the current node is not the root node, the number of occupied neighbours of the parent node of the current node and the number of occupied neighbours of the current node are determined. If the number of the occupied neighbours of the parent node is greater than or equal to a first threshold and the number of the occupied neighbours of the current node is greater than or equal to a second threshold, then proceed to determining the reconstructed attribute information of the occupied neighbouring nodes and the reconstructed attribute information of the occupied same-level neighbouring child nodes of the child node of the current node.

It may be noted that in embodiments of the disclosure, if the current node is not the root node, the number of neighbouring nodes of the current node and the parent node may be further determined, that is, the number of the occupied neighbours of the parent node and the number of the occupied neighbours of the current node are determined. If the number of the occupied neighbours of the parent node is greater than or equal to the first threshold and the number of the occupied neighbours of the current node is greater than or equal to the second threshold, then proceed to determining the reconstructed attribute information of the occupied neighbouring nodes and the reconstructed attribute information of the occupied same-level neighbouring child nodes of the child node of the current node, i.e., performing operations at 101.

Further, in embodiments of the disclosure, if the number of the occupied neighbours of the parent node is less than the first threshold or the number of the occupied neighbours of the current node is less than the second threshold, a bitstream is decoded to determine a quantized coefficient of the current node. A transformed coefficient is determined by performing inverse quantization on the quantized coefficient. Reconstructed attribute information of the current node is determined by performing inverse transform on the transformed coefficient.

It may be noted that in embodiments of the disclosure, if the current node is not the root node, the number of neighbouring nodes of the parent node of the current node may be further determined, that is, the number of the occupied neighbours of the parent node and the number of the occupied neighbours of the current node are determined. If the number of the occupied neighbours of the parent node is less than the first threshold or the number of the occupied neighbours of the current node is less than the second threshold, a corresponding transformed coefficient can be obtained by performing inverse quantization on a quantized coefficient decoded from a bitstream. Then, inverse transform is performed on the transformed coefficient, so that reconstructed attribute information of the current node can be determined.

It may be noted that in embodiments of the disclosure, the first threshold and the second threshold may be any preset value. For example, the first threshold may be 2, i.e., predictionThreshold[1]=2, and the second threshold may be 6, i.e., predictionThreshold[1]=6. The values of a third threshold and a fourth threshold are not limited in embodiments of the disclosure.

Further, in embodiments of the disclosure, the occupied same-level neighbouring child nodes of the child node of the current node and the child node of the current node are same-level neighbouring nodes, and the same-level neighbouring nodes are nodes of a same size.

It may be noted that in embodiments of the disclosure, the occupied same-level neighbouring child nodes of the child node of the current node and the child node of the current node may be same-level neighbouring nodes. The same-level neighbouring nodes may refer to nodes decoded at the same level, and the same-level neighbouring nodes may also refer to nodes of the same size.

It may be understood that in embodiments of the disclosure, the occupied neighbouring node of the current node is a parent-level neighbouring node (i.e., the parent level of the child node) of the current node. The occupied same-level neighbouring child node of the child node of the current node is a same-level neighbouring node (i.e., the same level of the child node) of the current node.

Further, in embodiments of the disclosure, the occupied neighbouring nodes include: the current node and an occupied coplanar neighbouring node and an occupied collinear neighbouring node of the current node. The occupied same-level neighbouring child nodes of the child node of the current node include: an occupied coplanar neighbouring node and an occupied collinear neighbouring node of the child node of the current node.

It may be noted that in embodiments of the disclosure, during prediction, the parent-level neighbouring nodes (i.e., neighbouring nodes of the current node) and the same-level neighbouring nodes (i.e., neighbouring nodes of the child node of the current node) of the current node need to be first searched. As such, the reconstructed attribute information of the occupied neighbouring nodes and the reconstructed attribute information of the occupied same-level neighbouring child nodes of the child node the current node can be determined.

Exemplarily, in embodiment of the disclosures, during searching for the parent-level neighbouring nodes of the current node, a specific search range includes the current node (a current parent-level node) and coplanar or collinear neighbouring nodes of the current node. Reconstructed attribute information of existing neighbouring nodes is recorded, where $A_{recP}$ represents reconstructed attribute information of the current node, $A_{recPface}$ represents reconstructed attribute information of the neighbouring node coplanar with the current node, and $A_{recPline}$ represents reconstructed attribute information of the neighbouring node collinear with the current node.

Exemplarily, in embodiments of the disclosure, during searching for the same-level neighbouring nodes of the child node of the current node, a specific search range includes neighbouring child nodes that are coplanar or collinear with the child node of the current node. Reconstructed attribute information of existing neighbouring child nodes is recorded, where $A_{recSface}$ represents reconstructed attribute information of the neighbouring node coplanar with the child node of the current node, and $A_{recSline}$ represents reconstructed attribute information of the neighbouring node collinear with the child node of the current node.

At 102, an attribute prediction value of the child node of the current node is determined according to the reconstructed attribute information of the occupied neighbouring nodes and the reconstructed attribute information of the occupied same-level neighbouring child nodes of the child node of the current node.

In embodiments of the disclosure, after the reconstructed attribute information of the occupied neighbouring nodes of the current node and the reconstructed attribute information of the occupied same-level neighbouring child nodes of the child node of the current node are determined, an attribute prediction value of the child node of the current node may be further determined according to the reconstructed attribute information of the occupied neighbouring nodes and the reconstructed attribute information of the occupied same-level neighbouring child nodes of the child node of the current node.

That is to say, in embodiments of the disclosure, for an upsampled prediction method, during prediction of attribute information, not only the same-level neighbouring node of the current node is used for prediction, but also the same-level neighbouring node of the child node of the current node is introduced. In other words, the attribute information is predicted by using both the same-level neighbouring node of the current node and the same-level neighbouring node of the child node.

Further, in embodiments of the disclosure, for each node among the occupied neighbouring nodes and the occupied same-level neighbouring child nodes of the child node of the current node, a weight corresponding to the node is determined, and the attribute prediction value of the child node of the current node is determined by weighting the reconstructed attribute information of the occupied neighbouring nodes and the reconstructed attribute information of the occupied same-level neighbouring child nodes of the child node of the current node according to the weights corresponding to the nodes.

It may be understood that in embodiments of the disclosure, for determining the attribute prediction value of the child node of the current node, a weighting operation may be performed according to the reconstructed attribute information of the occupied neighbouring nodes and the reconstructed attribute information of the occupied same-level neighbouring child nodes of the child node of the current node. Different neighbouring nodes may correspond to different weights, and a weight corresponding to each neighbouring node may be related to the Euclidean distance between the neighbouring node and the current node.

Further, in embodiments of the disclosure, the weights corresponding to the nodes include: a first weight corresponding to the current node, i.e., $W_{recP}$ corresponding to $A_{recP}$, a second weight corresponding to the occupied coplanar neighbouring node of the current node, i.e., $W_{recPface}$ corresponding to $A_{recPface}$, a third weight corresponding to the occupied collinear neighbouring node of the current node, i.e., $W_{recPline}$ corresponding to $A_{recPline}$, a fourth weight corresponding to the occupied coplanar neighbouring node of the child node of the current node, i.e., $W_{recSface}$ corresponding to $A_{recSface}$, and a fifth weight corresponding to the occupied collinear neighbouring node of the child node of the current node, i.e. $W_{recSline}$ corresponding to $A_{recSline}$.

Exemplarily, in embodiments of the disclosure, the attribute prediction value $A_{pre}$ of the child node of the current node may be calculated according to the following formula.

$$A_{pre} = \frac{A_{recP} \times W_{recP} + \sum_{i=1}^{n-1} A_{recPface} \times W_{recPface} + \sum_{i=1}^{n_2} A_{recPline} \times W_{recPline} + \sum_{i=1}^{n_3} A_{recSface} \times W_{recSface} + \sum_{i=1}^{n_4} A_{recSline} \times W_{recSline}}{W_{recP} + n_1 \times W_{recPface} + n_2 \times W_{recPline} + n_3 \times W_{recSface} + n_4 \times W_{recSline}} \quad (3)$$

In the above, $A_{pre}$ is the attribute prediction value of the child node of the current node. $W_{recP}$, $W_{recPface}$, $W_{recPline}$, $W_{recSface}$, and $W_{recSline}$ are weights corresponding to neighbours $A_{recP}$, $A_{recPface}$, $A_{recPline}$, $A_{recSface}$, and $A_{recSline}$, respectively, where the weight is related to the Euclidean distance. $n_1$, $n_2$, $n_3$, and $n_4$ represent the number of the found parent-level coplanar neighbours, parent-level collinear neighbours, same-level coplanar neighbours, and same-level collinear neighbours of the child node, respectively.

Further, in embodiments of the disclosure, reference neighbouring nodes are determined by filtering the occupied neighbouring nodes and the occupied same-level neighbouring child nodes of the child node of the current node. The attribute prediction value of the child node of the current node is determined according to reconstructed attribute information of the reference neighbouring nodes.

It may be understood that in embodiments of the disclosure, after the search for the parent-level neighbouring nodes and the same-level neighbouring nodes is completed, reference neighbouring nodes may be further obtained by filtering and/or limiting the parent-level neighbouring nodes and the same-level neighbouring nodes, and then the reference neighbouring nodes are used to determine the attribute prediction value of the child node of the current node. The reference neighbouring nodes may be part or all of neighbouring nodes among the found occupied neighbouring nodes and occupied same-level neighbouring child nodes of the child node of the current node.

Further, in embodiments of the disclosure, for each node among the reference neighbouring nodes, a weight corresponding to the node is determined, and the attribute prediction value of the child node of the current node is determined by weighting the reconstructed attribute information of the reference neighbouring nodes according to the weights corresponding to the nodes.

It may be understood that in embodiments of the disclosure, for determining the attribute prediction value of the child node of the current node, a weighting operation may be performed according to the reconstructed attribute information of the reference neighbouring nodes. Different neighbouring nodes may correspond to different weights, and a weight corresponding to each neighbouring node may be related to the Euclidean distance between the neighbouring node and the current node.

Exemplarily, in embodiments of the disclosure, for a specific method for performing the weighting operation according to the reconstructed attribute information of the reference neighbouring nodes, reference can be made to the above formula (3).

Further, in embodiments of the disclosure, a first preset threshold is determined according to reconstructed attribute information of the current node, where the first preset threshold may include a first prediction threshold and a second prediction threshold. Next, the reference neighbouring nodes may be determined by filtering the occupied neighbouring nodes and the occupied same-level neighbouring child nodes of the child node of the current node according to the first preset threshold.

Further, in embodiments of the disclosure, a first prediction threshold and a second prediction threshold are determined according to reconstructed attribute information of the current node. The reference neighbouring nodes are determined by filtering the occupied neighbouring nodes and the occupied same-level neighbouring child nodes of the child node of the current node according to the first prediction threshold and the second prediction threshold.

It may be noted that in embodiments of the disclosure, the parent-level neighbouring nodes and the same-level neighbouring nodes may be filtered, so as to determine the reference neighbouring nodes. During filtering, the first prediction threshold lim i tLow and the second prediction threshold lim i tHigh may be determined according to reconstructed attribute information of the parent node (that is, the first preset threshold may include lim i tLow and lim i tHigh), and reference can be made to the above formulas (1) and (2). Then, the occupied neighbouring nodes and the occupied same-level neighbouring child nodes of the child node of the current node may be filtered according to the first prediction threshold and the second prediction threshold.

Exemplarily, assuming that an attribute value of the occupied neighbouring node (or the occupied same-level neighbouring child node of the child node of the current node) is attrnei, if lim i tLow<10×attrnei<lim i tHigh, then the occupied neighbouring node may be added to a reference neighbouring point set of a current child node, that is, this neighbouring node is determined as the reference neighbouring node. Otherwise, this neighbouring node is not used for prediction, i.e., not used as the reference neighbouring node.

Further, in embodiments of the disclosure, in the reference neighbouring nodes, the number of occupied neighbouring nodes is limited to be less than or equal to a third threshold, and/or the number of occupied same-level neighbouring child nodes of the child node of the current node is limited to be less than or equal to a fourth threshold.

That is to say, in embodiments of the disclosure, the number of occupied neighbouring nodes in the reference neighbouring nodes is less than or equal to a third threshold. The number of occupied same-level neighbouring child nodes in the reference neighbouring nodes is less than or equal to a fourth threshold.

It may be noted that in embodiments of the disclosure, the parent-level neighbouring nodes and the same-level neighbouring nodes may be limited. In particular, the number of occupied neighbouring nodes and/or the number of occupied same-level neighbouring child nodes of the child node of the current node may be limited.

Exemplarily, the number of occupied neighbouring nodes is limited to be no more than the third threshold (e.g., 6), and/or the number of occupied same-level neighbouring child nodes of the child node of the current node is limited to be no more than the fourth threshold (e.g., 12). The values of the third threshold and the fourth threshold are not limited in embodiments of the disclosure.

At 103, a first transformed coefficient is determined by performing RAHT on the attribute prediction value, and reconstructed attribute information of the child node of the current node is determined according to the first transformed coefficient.

In embodiments of the disclosure, after the attribute prediction value of the child node of the current node is determined according to the reconstructed attribute information of the occupied neighbouring nodes and the reconstructed attribute information of the occupied same-level neighbouring child nodes of the child node of the current node, RAHT may be further performed on the attribute prediction value to determine a first transformed coefficient, and reconstructed attribute information of the child node of the current node is determined according to the first transformed coefficient.

Further, in embodiments of the disclosure, a bitstream may be first decoded to determine a quantized coefficient residual (a coefficient residual value) of the child node of the current node. A coefficient residual of the child node of the current node is determined by performing inverse quantization (scaling) on the quantized coefficient residual.

Further, in embodiments of the disclosure, for determining the reconstructed attribute information of the child node of the current node according to the first transformed coefficient, a second transformed coefficient of the child node of the current node may be determined according to the first transformed coefficient and the coefficient residual, and the reconstructed attribute information of the child node of the current node is determined by performing inverse transform on the second transformed coefficient.

Further, in embodiments of the disclosure, after the reconstructed attribute information of the child node of the current node is determined according to the first transformed coefficient, the reconstructed attribute information of the current node may be further determined according to the reconstructed attribute information of all child nodes of the current node.

It may be noted that in embodiments of the disclosure, a method performed by a decoder for decoding a point cloud may include the following.

At 104, if a current node is not a root node, the number of occupied neighbours of a parent node of the current node and the number of occupied neighbours of the current node are determined.

At 105, if the number of the occupied neighbours of the parent node is greater than or equal to a first threshold and the number of the occupied neighbours of the current node is greater than or equal to a second threshold, reconstructed attribute information of occupied neighbouring nodes of the current node and reconstructed attribute information of occupied same-level neighbouring child nodes of a child node of the current node are determined.

At 102, an attribute prediction value of the child node of the current node is determined according to the reconstructed attribute information of the occupied neighbouring nodes and the reconstructed attribute information of the occupied same-level neighbouring child nodes of the child node of the current node.

At 103, a first transformed coefficient is determined by performing RAHT on the attribute prediction value, and reconstructed attribute information of the child node of the current node is determined according to the first transformed coefficient.

In embodiments of the disclosure, during decoding of the current node, whether the current node is the root node may be first determined. If the current node is not the root node, the number of the occupied neighbours of the parent node of the current node and the number of the occupied neighbours of the current node may be further determined. As such, whether to perform operations at 102 and 103 can be determined according to the number of the occupied neighbours of the parent node of the current node and the number of the occupied neighbours of the current node. That is, whether to introduce same-level neighbouring nodes of the current node and same-level neighbouring child nodes of the child node for prediction of attribute information of the current node is further determined according to the number of the occupied neighbours of the parent node of the current node and the number of the occupied neighbours of the current node.

Further, in embodiments of the disclosure, after the number of the occupied neighbours of the parent node of the current node and the number of the occupied neighbours of the current node are determined, if the number of the occupied neighbours of the parent node is greater than or equal to the first threshold and the number of the occupied neighbours of the current node is greater than or equal to the second threshold, then it may be determined that the same-level neighbouring nodes of the current node and the same-level neighbouring child nodes of the child node are introduced for prediction of the attribute information of the current node. Therefore, reconstructed attribute information of occupied neighbouring nodes of the current node and reconstructed attribute information of occupied same-level neighbouring child nodes of the child node of the current node need to be further determined. Then, an attribute prediction value of the child node of the current node is determined according to the reconstructed attribute information of the occupied neighbouring nodes and the reconstructed attribute information of the occupied same-level neighbouring child nodes of the child node of the current node. Finally, a first transformed coefficient is determined by performing RAHT on the attribute prediction value, and reconstructed attribute information of the child node of the current node is determined according to the first transformed coefficient.

Further, in embodiments of the disclosure, if the current node is the root node, it may be directly determined that there is no need to introduce the same-level neighbouring nodes of the current node and the same-level neighbouring child nodes of the child node for prediction of the attribute information of the current node, but inverse quantization is directly performed on a quantized coefficient decoded from a bitstream to obtain a corresponding transformed coefficient. Then, inverse transform is performed on the transformed coefficient, so that reconstructed attribute information of the current node can be determined.

Further, in embodiments of the disclosure, after the number of the occupied neighbours of the parent node of the current node and the number of the occupied neighbours of the current node are determined, if the number of the occupied neighbours of the parent node is less than the first threshold or the number of the occupied neighbours of the current node is less than the second threshold, then it may be determined that there is no need to introduce the same-level neighbouring nodes of the current node and the same-level neighbouring child nodes of the child node for prediction of the attribute information of the current node, but inverse quantization is directly performed on a quantized coefficient decoded from a bitstream to obtain a corresponding transformed coefficient. Then, inverse transform is performed on the transformed coefficient, so that reconstructed attribute information of the current node can be determined.

A point cloud decoding method is disclosed in embodiments of the disclosure. A decoder determines reconstructed attribute information of occupied neighbouring nodes of a current node and reconstructed attribute information of occupied same-level neighbouring child nodes of a child node of the current node. The decoder determines an attribute prediction value of the child node of the current node according to the reconstructed attribute information of the occupied neighbouring nodes and the reconstructed attribute information of the occupied same-level neighbouring child nodes of the child node of the current node. The decoder determines a first transformed coefficient by performing RAHT on the attribute prediction value, and determines reconstructed attribute information of the child node of the current node according to the first transformed coefficient. That is to say, in embodiments of the disclosure, for the RAHT process, during prediction of attribute information of the current node, the reconstructed attribute information of the occupied neighbouring nodes of the current node and the reconstructed attribute information of the occupied same-level neighbouring child nodes of the child node of the current node can be used to determine the attribute prediction value of the child node of the current node. In other words, on the basis of upsampled prediction, same-level neighbouring nodes of the current node and same-level neighbouring child nodes of the child node are introduced for prediction of the attribute information, that is, parent-level neighbouring nodes and the same-level neighbouring child nodes of the child node of the current node are introduced for prediction of the attribute information. As such, the coding efficiency and the video compression performance can be improved.

Based on the above embodiments, a point cloud encoding method is provided in another embodiment of the disclosure. FIG. 6 is a schematic diagram of an implementation process of a point cloud encoding method provided in embodiments of the disclosure. As illustrated in FIG. 6, a method performed by an encoder for encoding a point cloud may include the following.

At 201, reconstructed attribute information of occupied neighbouring nodes of a current node and reconstructed attribute information of occupied same-level neighbouring child nodes of a child node of the current node are determined.

In embodiments of the disclosure, reconstructed attribute information of occupied neighbouring nodes of a current node may be first determined, and at the same time, reconstructed attribute information of occupied same-level neighbouring child nodes of a child node of the current node may be determined.

It may be understood that in embodiments of the disclosure, the current node may be a point in a to-be-encoded point cloud, and the current node may be a block with a transform unit of RAHT being 2×2×2. Accordingly, the child node of the current node may be a subblock in the block with the transform unit of RAHT being 2×2×2, and a parent node of the current node is a node at a previous level of the current node.

It may be understood that in embodiments of the disclosure, at an encoding end, an octree structure is constructed from the bottom to the top according to geometry information, and then parsing is performed layer by layer from a root node. The transform unit of RAHT is a 2×2×2 block, which is defined as a to-be-encoded node, i.e., the current node.

Further, in embodiments of the disclosure, if the current node is the root node, a transformed coefficient is determined by performing RAHT on reconstructed attribute information of the current node. A quantized coefficient is determined by quantizing the transformed coefficient. The quantized coefficient is signalled into the bitstream.

It may be understood that in embodiments of the disclosure, if the current node is the root node, then a transformed coefficient may be determined by performing RAHT on reconstructed attribute information of the current node. The transformed coefficient is quantized to determine a quantized coefficient. The quantized coefficient is signalled into the bitstream.

Further, in embodiments of the disclosure, if the current node is not the root node, the number of occupied neighbours of the parent node of the current node and the number of occupied neighbours of the current node are determined. If the number of the occupied neighbours of the parent node is greater than or equal to a first threshold and the number of the occupied neighbours of the current node is greater than or equal to a second threshold, then proceed to determining the reconstructed attribute information of the occupied neighbouring nodes and the reconstructed attribute information of the occupied same-level neighbouring child nodes of the child node of the current node.

It may be noted that in embodiments of the disclosure, if the current node is not the root node, the number of neighbouring nodes of the current node and the parent node may be further determined, that is, the number of the occupied neighbours of the parent node and the number of the occupied neighbours of the current node are determined. If the number of the occupied neighbours of the parent node is greater than or equal to the first threshold and the number of the occupied neighbours of the current node is greater than or equal to the second threshold, then proceed to determining the reconstructed attribute information of the occupied neighbouring nodes and the reconstructed attribute information of the occupied same-level neighbouring child nodes of the child node of the current node, i.e., performing operations at 201.

Further, in embodiments of the disclosure, if the number of the occupied neighbours of the parent node is less than the first threshold or the number of the occupied neighbours of the current node is less than the second threshold, a transformed coefficient is determined by performing RAHT on reconstructed attribute information of the current node. A quantized coefficient is determined by quantizing the transformed coefficient. The quantized coefficient is signalled into the bitstream.

It may be noted that in embodiments of the disclosure, if the current node is not the root node, the number of neighbouring nodes of the parent node of the current node may be further determined, that is, the number of the occupied neighbours of the parent node and the number of the occupied neighbours of the current node are determined. If the number of the occupied neighbours of the parent node is less than the first threshold or the number of the occupied neighbours of the current node is less than the second threshold, then a transformed coefficient may be determined by performing RAHT on reconstructed attribute information of the current node. A quantized coefficient is determined by quantizing the transformed coefficient. The quantized coefficient is signalled into the bitstream.

It may be noted that in embodiments of the disclosure, the first threshold and the second threshold may be any preset value. For example, the first threshold may be 2, i.e., predictionThreshold[1]=2, and the second threshold may be 6, i.e., predictionThreshold[1]=6. The values of a third threshold and a fourth threshold are not limited in embodiments of the disclosure.

Further, in embodiments of the disclosure, the occupied same-level neighbouring child nodes of the child node of the current node and the child node of the current node are same-level neighbouring nodes, and the same-level neighbouring nodes are nodes of a same size.

It may be noted that in embodiments of the disclosure, the occupied same-level neighbouring child nodes of the child node of the current node and the current node may be same-level neighbouring nodes. The same-level neighbouring nodes may refer to nodes at the same level, and same-level neighbouring nodes may also refer to nodes of the same size.

It may be understood that in embodiments of the disclosure, the occupied neighbouring node of the current node is a parent-level neighbouring node (i.e., the parent level of the child node) of the current node. The occupied same-level neighbouring child node of the child node of the current node is a same-level neighbouring node (i.e., the same level of the child node) of the current node.

Further, in embodiments of the disclosure, the occupied neighbouring nodes include: the current node and an occupied coplanar neighbouring node and an occupied collinear neighbouring node of the current node. The occupied same-level neighbouring child nodes of the child node of the current node includes: an occupied coplanar neighbouring node and an occupied collinear neighbouring node of the child node of the current node.

It may be noted that in embodiments of the disclosure, during prediction, the parent-level neighbouring nodes (i.e., neighbouring nodes of the current node) and the same-level neighbouring nodes (i.e., neighbouring nodes of the child node of the current node) of the current node need to be first searched. As such, the reconstructed attribute information of the occupied neighbouring nodes and the reconstructed attribute information of the occupied same-level neighbouring child nodes of the child node the current node can be determined.

Exemplarily, in embodiment of the disclosures, during searching for the parent-level neighbouring nodes of the current node, a specific search range includes the current node (a current parent-level node) and coplanar or collinear neighbouring nodes of the current node. Reconstructed attribute information of existing neighbouring nodes is recorded, where $A_{recP}$ represents reconstructed attribute information of the current node, $A_{recPface}$ represents reconstructed attribute information of the neighbouring node coplanar with the current node, and $A_{recPline}$ represents reconstructed attribute information of the neighbouring node collinear with the current node.

Exemplarily, in embodiments of the disclosure, during searching for the same-level neighbouring nodes of the child node of the current node, a specific search range includes neighbouring child nodes that are coplanar or collinear with the child node of the current node. Reconstructed attribute information of existing neighbouring nodes is recorded, where $A_{recSface}$ represents reconstructed attribute information of the neighbouring node coplanar with the child node of the current node, and $A_{recSline}$ represents reconstructed attribute information of the neighbouring node collinear with the child node of the current node.

At 202, an attribute prediction value of the child node of the current node is determined according to the reconstructed attribute information of the occupied neighbouring nodes and the reconstructed attribute information of the occupied same-level neighbouring child nodes of the child node of the current node.

In embodiments of the disclosure, after the reconstructed attribute information of the occupied neighbouring nodes of the current node and the reconstructed attribute information of the occupied same-level neighbouring child nodes of the child node of the current node are determined, an attribute prediction value of the child node of the current node may be further determined according to the reconstructed attribute information of the occupied neighbouring nodes and the reconstructed attribute information of the occupied same-level neighbouring child nodes of the child node of the current node.

That is to say, in embodiments of the disclosure, for an upsampled prediction method, during prediction of attribute information, not only the same-level neighbouring node of the current node is used for prediction, but also the same-level neighbouring node of the child node of the current node is introduced. In other words, the attribute information is predicted by using both the same-level neighbouring node of the current node and the same-level neighbouring node of the child node.

Further, in embodiments of the disclosure, for each node among the occupied neighbouring nodes and the occupied same-level neighbouring child nodes of the child node of the current node, a weight corresponding to the node is determined, and the attribute prediction value of the child node of the current node is determined by weighting the reconstructed attribute information of the occupied neighbouring nodes and the reconstructed attribute information of the occupied same-level neighbouring child nodes of the child node of the current node according to the weights corresponding to the nodes.

It may be understood that in embodiments of the disclosure, for determining the attribute prediction value of the child node of the current node, a weighting operation may be performed according to the reconstructed attribute information of the occupied neighbouring nodes and the reconstructed attribute information of the occupied same-level neighbouring child nodes of the child node of the current node. Different neighbouring nodes may correspond to different weights, and a weight corresponding to each neighbouring node may be related to the Euclidean distance between the neighbouring node and the current node.

Further, in embodiments of the disclosure, the weights corresponding to the nodes include: a first weight corresponding to the current node, i.e., $W_{recP}$ corresponding to $A_{recP}$, a second weight corresponding to the occupied coplanar neighbouring node of the current node, i.e., $W_{recPface}$ corresponding to $A_{recPface}$, a third weight corresponding to the occupied collinear neighbouring node of the current node, i.e., $W_{recPline}$ corresponding to $A_{recPline}$, a fourth weight corresponding to the occupied coplanar neighbouring node of the child node of the current node, i.e., $W_{recSface}$ corresponding to $A_{recSface}$, and a fifth weight corresponding to the occupied collinear neighbouring node of the child node of the current node, i.e. $W_{recSline}$ corresponding to $A_{recSline}$.

Exemplarily, in embodiments of the disclosure, the attribute prediction value $A_{pre}$ of the child node of the current node may be calculated according to the above formula (3). In the above, $A_{pre}$ is the attribute prediction value of the child node of the current node. $W_{recP}$, $W_{recPface}$, $W_{recPline}$, $W_{recSface}$, and $W_{recSline}$ are weights corresponding to neighbours $A_{recP}$, $A_{recPface}$, $A_{recPline}$, $A_{recSface}$, and $A_{recSline}$, respectively, where the weight is related to the Euclidean distance. $n_1$, $n_2$, $n_3$, and $n_4$ represent the number of the found parent-level coplanar neighbours, parent-level collinear neighbours, same-level coplanar neighbours, and same-level collinear neighbours of the child node, respectively.

Further, in embodiments of the disclosure, reference neighbouring nodes are determined by filtering the occupied neighbouring nodes and the occupied same-level neighbouring child nodes of the child node of the current node. The attribute prediction value of the child node of the current node is determined according to reconstructed attribute information of the reference neighbouring nodes.

It may be understood that in embodiments of the disclosure, after the search for the parent-level neighbouring nodes and the same-level neighbouring nodes is completed, reference neighbouring nodes may be further obtained by filtering and/or limiting the parent-level neighbouring nodes and the same-level neighbouring nodes, and then the reference neighbouring nodes are used to determine the attribute prediction value of the child node of the current node. The reference neighbouring nodes may be part or all of neighbouring nodes among the found occupied neighbouring nodes and occupied same-level neighbouring child nodes of the child node of the current node.

Further, in embodiments of the disclosure, for each node among the reference neighbouring nodes, a weight corresponding to the node is determined, and the attribute prediction value of the child node of the current node is determined by weighting the reconstructed attribute information of the reference neighbouring nodes according to the weights corresponding to the nodes.

It may be understood that in embodiments of the disclosure, for determining the attribute prediction value of the child node of the current node, a weighting operation may be performed according to the reconstructed attribute information of the reference neighbouring nodes. Different neighbouring nodes may correspond to different weights, and a weight corresponding to each neighbouring node may be related to the Euclidean distance between the neighbouring node and the current node.

Exemplarily, in embodiments of the disclosure, for a specific method for performing the weighting operation according to the reconstructed attribute information of the reference neighbouring nodes, reference can be made to the above formula (3).

Further, in embodiments of the disclosure, a first preset threshold is determined according to reconstructed attribute information of the current node, where the first preset threshold may include a first prediction threshold and a second prediction threshold. Next, the reference neighbouring nodes may be determined by filtering the occupied neighbouring nodes and the occupied same-level neighbouring child nodes of the child node of the current node according to the first preset threshold.

Further, in embodiments of the disclosure, a first prediction threshold and a second prediction threshold are determined according to reconstructed attribute information of the current node. The reference neighbouring nodes are determined by filtering the occupied neighbouring nodes and the occupied same-level neighbouring child nodes of the child node of the current node according to the first prediction threshold and the second prediction threshold.

It may be noted that in embodiments of the disclosure, the parent-level neighbouring nodes and the same-level neighbouring nodes may be filtered, so as to determine the reference neighbouring nodes. During filtering, the first prediction threshold lim i tLow and the second prediction threshold lim i tHigh may be determined according to reconstructed attribute information of the parent node (that is, the first preset threshold may include lim i tLow and lim i tHigh), and reference can be made to the above formulas (1) and (2). Then, the occupied neighbouring nodes and the occupied same-level neighbouring child nodes of the child node of the current node may be filtered according to the first prediction threshold and the second prediction threshold.

Exemplarily, assuming that an attribute value of the occupied neighbouring node (or the occupied same-level neighbouring child node of the child node of the current node) is attrnei, if lim i tLow<10×attrnei<lim i tHigh, then the occupied neighbouring node may be added to a reference neighbouring point set of a current child node, that is, this neighbouring node is determined as the reference neighbouring node. Otherwise, this neighbouring node is not used for prediction, i.e., not used as the reference neighbouring node.

Further, in embodiments of the disclosure, in the reference neighbouring nodes, the number of occupied neighbouring nodes is limited to be less than or equal to a third threshold, and/or the number of occupied same-level neighbouring child nodes of the child node of the current node is limited to be less than or equal to a fourth threshold.

That is to say, in embodiments of the disclosure, the number of occupied neighbouring nodes in the reference neighbouring nodes is less than or equal to a third threshold. The number of occupied same-level neighbouring child nodes in the reference neighbouring nodes is less than or equal to a fourth threshold.

It may be noted that in embodiments of the disclosure, the parent-level neighbouring nodes and the same-level neighbouring nodes may be limited. In particular, the number of occupied neighbouring nodes and/or the number of occupied same-level neighbouring child nodes of the child node of the current node may be limited.

Exemplarily, the number of occupied neighbouring nodes is limited to be no more than the third threshold (e.g., 6), and/or the number of occupied same-level neighbouring child nodes of the child node of the current node is limited to be no more than the fourth threshold (e.g., 12). The values of the third threshold and the fourth threshold are not limited in embodiments of the disclosure.

At 203, a first transformed coefficient is determined by performing RAHT on the attribute prediction value, and a quantized coefficient residual of the child node of the current node is determined according to the first transformed coefficient.

In embodiments of the disclosure, after the attribute prediction value of the child node of the current node is determined according to the reconstructed attribute information of the occupied neighbouring nodes and the reconstructed attribute information of the occupied same-level neighbouring child nodes of the child node of the current node, RAHT may be further performed on the attribute prediction value to determine a first transformed coefficient, and a quantized coefficient residual (a coefficient residual value) of the child node of the current node is determined according to the first transformed coefficient.

Further, in embodiments of the disclosure, a second transformed coefficient is determined by performing RAHT on original attribute information of the child node of the current node. A coefficient residual between the first transformed coefficient and the second transformed coefficient is determined. The quantized coefficient residual is determined by quantizing the coefficient residual.

At 204, the quantized coefficient residual is signalled into a bitstream.

In embodiments of the disclosure, after the quantized coefficient residual of the child node of the current node is determined according to the first transformed coefficient, the quantized coefficient residual may be signalled into a bitstream.

Further, in embodiments of the disclosure, a method performed by an encoder for encoding a point cloud may include the following.

At 205, if a current node is not a root node, the number of occupied neighbours of a parent node of the current node and the number of occupied neighbours of the current node are determined.

At 206, if the number of the occupied neighbours of the parent node is greater than or equal to a first threshold and the number of the occupied neighbours of the current node is greater than or equal to a second threshold, reconstructed attribute information of occupied neighbouring nodes of the current node and reconstructed attribute information of occupied same-level neighbouring child nodes of a child node of the current node are determined.

At 202, an attribute prediction value of the child node of the current node is determined according to the reconstructed attribute information of the occupied neighbouring nodes and the reconstructed attribute information of the occupied same-level neighbouring child nodes of the child node of the current node.

At 203, a first transformed coefficient is determined by performing RAHT on the attribute prediction value, and a quantized coefficient residual of the child node of the current node is determined according to the first transformed coefficient.

At 204, the quantized coefficient residual is signalled into a bitstream.

In embodiments of the disclosure, during encoding of the current node, whether the current node is the root node may be first determined. If the current node is not the root node, the number of the occupied neighbours of the parent node of the current node and the number of the occupied neighbours of the current node may be further determined. As such, whether to perform operations at 202 to 204 can be determined according to the number of the occupied neighbours of the parent node of the current node and the number of the occupied neighbours of the current node. That is, whether to introduce same-level neighbouring nodes of the current node and same-level neighbouring child nodes of the child node for prediction of attribute information of the current node is further determined according to the number of the occupied neighbours of the parent node of the current node and the number of the occupied neighbours of the current node.

Further, in embodiments of the disclosure, after the number of the occupied neighbours of the parent node of the current node and the number of the occupied neighbours of the current node are determined, if the number of the occupied neighbours of the parent node is greater than or equal to the first threshold and the number of the occupied neighbours of the current node is greater than or equal to the second threshold, then it may be determined that the same-level neighbouring nodes of the current node and the same-level neighbouring child nodes of the child node are introduced for prediction of the attribute information of the current node. Therefore, reconstructed attribute information of occupied neighbouring nodes of the current node and reconstructed attribute information of occupied same-level neighbouring child nodes of the child node of the current node need to be further determined. Then, an attribute prediction value of the child node of the current node is determined according to the reconstructed attribute information of the occupied neighbouring nodes and the reconstructed attribute information of the occupied same-level neighbouring child nodes of the child node of the current node. Next, a first transformed coefficient is determined by performing RAHT on the attribute prediction value, and a quantized coefficient residual of the child node of the current node is determined according to the first transformed coefficient. Finally, the quantized coefficient residual is signalled into a bitstream.

Further, in embodiments of the disclosure, if the current node is the root node, it may be directly determined that there is no need to introduce the same-level neighbouring nodes of the current node and the same-level neighbouring child nodes of the child node for prediction of the attribute information of the current node, but RAHT is directly performed on reconstructed attribute information of the current node to determine a transformed coefficient. A quantized coefficient is determined by quantizing the transformed coefficient. The quantized coefficient is signalled into the bitstream.

Further, in embodiments of the disclosure, after the number of the occupied neighbours of the parent node of the current node and the number of the occupied neighbours of the current node are determined, if the number of the occupied neighbours of the parent node is less than the first threshold or the number of the occupied neighbours of the current node is less than the second threshold, then it may be determined that there is no need to introduce the same-level neighbouring nodes of the current node and the same-level neighbouring child nodes of the child node for prediction of the attribute information of the current node, but RAHT is directly performed on reconstructed attribute information of the current node to determine a transformed coefficient. A quantized coefficient is determined by quantizing the transformed coefficient. The quantized coefficient is signalled into the bitstream.

A point cloud encoding method is disclosed in embodiments of the disclosure. An encoder determines reconstructed attribute information of occupied neighbouring nodes of a current node and reconstructed attribute information of occupied same-level neighbouring child nodes of a child node of the current node. The encoder determines an attribute prediction value of the child node of the current node according to the reconstructed attribute information of the occupied neighbouring nodes and the reconstructed attribute information of the occupied same-level neighbouring child nodes of the child node of the current node. The encoder determines a first transformed coefficient by performing RAHT on the attribute prediction value, and determines a quantized coefficient residual of the child node of the current node according to the first transformed coefficient. The encoder signals the quantized coefficient residual into a bitstream. That is to say, in embodiments of the disclosure, for the RAHT process, during prediction of attribute information of the current node, the reconstructed attribute information of the occupied neighbouring nodes of the current node and the reconstructed attribute information of the occupied same-level neighbouring child nodes of the child node of the current node can be used to determine the attribute prediction value of the child node of the current node. In other words, on the basis of upsampled prediction, same-level neighbouring nodes of the current node and same-level neighbouring child nodes of the child node are introduced for prediction of the attribute information, that is, parent-level neighbouring nodes and the same-level neighbouring child nodes of the child node of the current node are introduced for prediction of the attribute information. As such, the coding efficiency and the video compression performance can be improved.

Based on the above embodiments, a point cloud encoding method and a point cloud decoding method are provided in yet another embodiment of the disclosure.

At an encoding end, for RAHT, an octree structure is constructed from the bottom to the top according to geometry information, and then parsing is performed layer by layer from a root node. A transform unit of RAHT is a 2×2×2 block, which is defined as a to-be-encoded node, i.e., a current node (a current parent-level node). The current node may be the block with the transform unit of RAHT being 2×2×2, and a child node of the current node may be a subblock in the block with the transform unit of RAHT being 2×2×2.

If the current node is the root node, the prediction is skipped, and RAHT is directly performed on attribute information. Then, a transformed DC coefficient (direct-current coefficient) and AC coefficient (alternating-current coefficient) (transformed coefficients) are quantized and entropy-encoded.

If the current node is not the root node, whether to predict the current node is determined according to the number of neighbours of a parent node and the current node (the number of occupied neighbours of the parent node and the number of occupied neighbours of the current node). If the prediction is needed, an attribute prediction value of each child node of the current node can be obtained by performing neighbour search and weighted prediction on the child node of the current node. Then, RAHT is performed on the prediction value and an original value of the attribute, respectively. Finally, a residual between an AC coefficient of the prediction value (a first transformed coefficient) and an AC coefficient of the original value (a second transformed coefficient) is quantized and entropy-encoded. If the prediction is skipped, RAHT is directly performed on the original attribute value of the current node, and the AC coefficient (transformed coefficient) is quantized and entropy-encoded.

Figure 7:
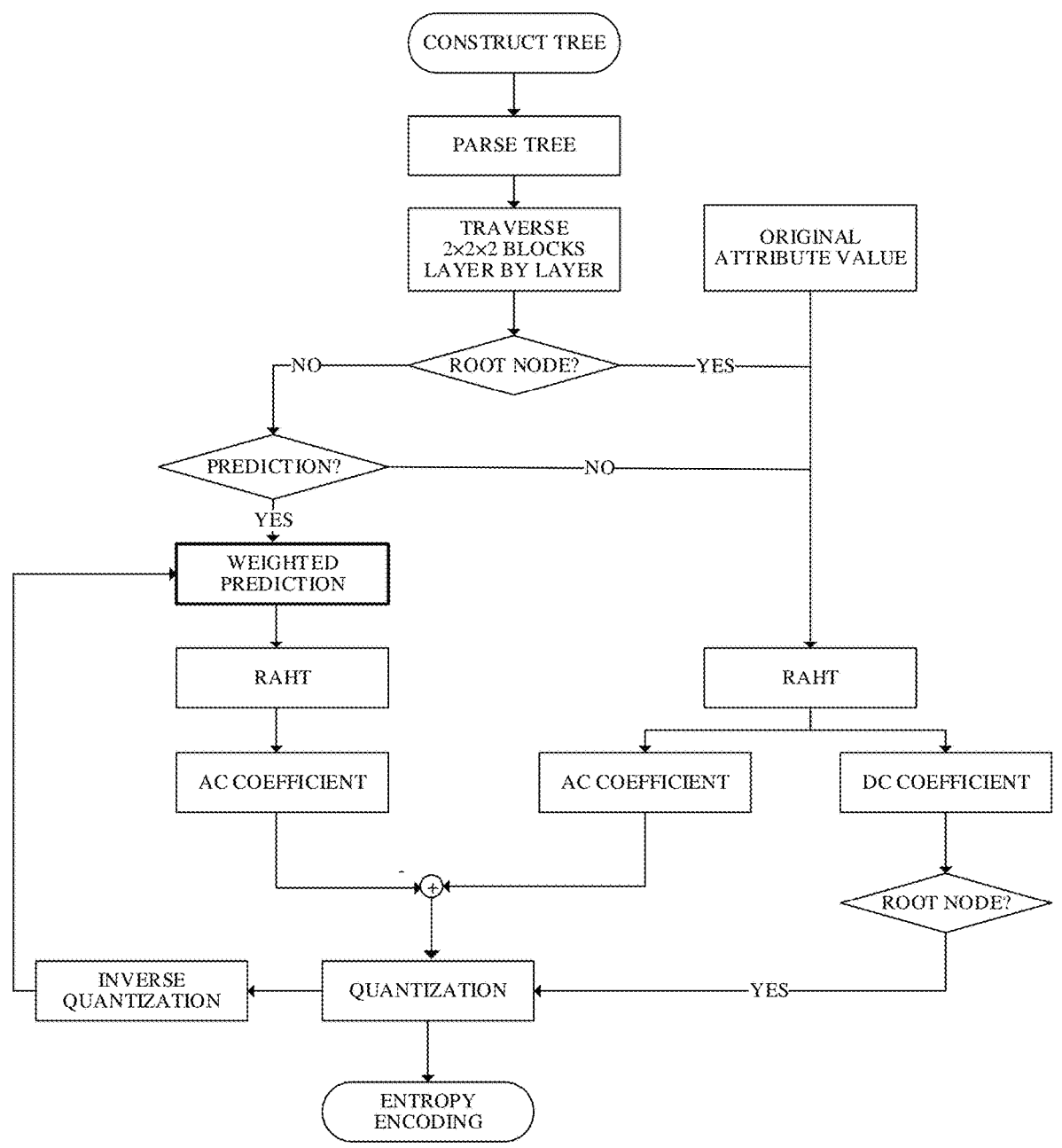
FIG. 7 is a flowchart of RAHT encoding.

In an embodiment, FIG. 7 is a flowchart of RAHT encoding. As illustrated in FIG. 7, at an encoding end, for RAHT, an octree structure is constructed from the bottom to the top according to geometry information, and then parsing is performed layer by layer from a root node. A transform unit of RAHT is a 2×2×2 block, which is defined as a to-be-encoded node, i.e., a current node.

If the to-be-encoded node is the root node, the prediction is skipped, and RAHT is directly performed on attribute information. Then, a transformed DC coefficient (direct-current coefficient) and AC coefficient (alternating-current coefficient) are quantized and entropy-encoded.

If the to-be-encoded node is not the root node, whether to predict a current to-be-encoded node is determined according to the number of neighbours of a parent node of the current to-be-encoded node and the current to-be-encoded node. If the prediction is needed, an attribute prediction value of each occupied child node can be obtained by performing neighbour search and weighted prediction on the corresponding child node of the current to-be-encoded node. Then, RAHT is performed on the prediction value and an original value of the attribute, respectively. Finally, a residual between AC coefficients of the prediction value and the original value is quantized and entropy-encoded. If the prediction is skipped, RAHT is directly performed on the original attribute value, and the AC coefficient is quantized and entropy-encoded.

Further, for the point cloud decoding method proposed in embodiments of the disclosure, the processing at the decoding end is the same as that at the encoding end. An octree structure is constructed from the bottom to the top according to geometry information, and then parsing is performed layer by layer from a root node. A transform unit of RAHT is a 2×2×2 block, which is defined as a to-be-decoded node, i.e., a current node (a current parent-level node). The current node may be the block with the transform unit of RAHT being 2×2×2, and a child node of the current node may be a subblock in the block with the transform unit of RAHT being 2×2×2.

If the current node is the root node, the prediction is skipped, and a bitstream is directly decoded and then a reconstructed coefficient is obtained through inverse quantization. Then, attribute reconstruction information (reconstructed attribute information) is obtained by performing inverse transform on reconstructed DC and AC coefficients (transformed coefficients).

If the current node is not the root node, whether to predict the current node is determined according to the number of neighbours of a parent node and the current node (the number of occupied neighbours of the parent node and the number of occupied neighbours of the current node). If the prediction is needed, neighbour search and weighted prediction are performed on each child node of the current node, and an AC coefficient (a first transformed coefficient) of the prediction value is obtained through transform. The AC coefficient of the prediction value is added to a reconstructed AC coefficient residual (coefficient residual) obtained through decoding, so as to obtain a reconstructed AC coefficient (a second transformed coefficient) corresponding to the original attribute value. Finally, attribute reconstruction information is obtained through inverse transform. If the prediction is skipped, attribute reconstruction information is directly obtained by performing inverse transform on the reconstructed coefficient (transformed coefficient) obtained through decoding.

Figure 8:
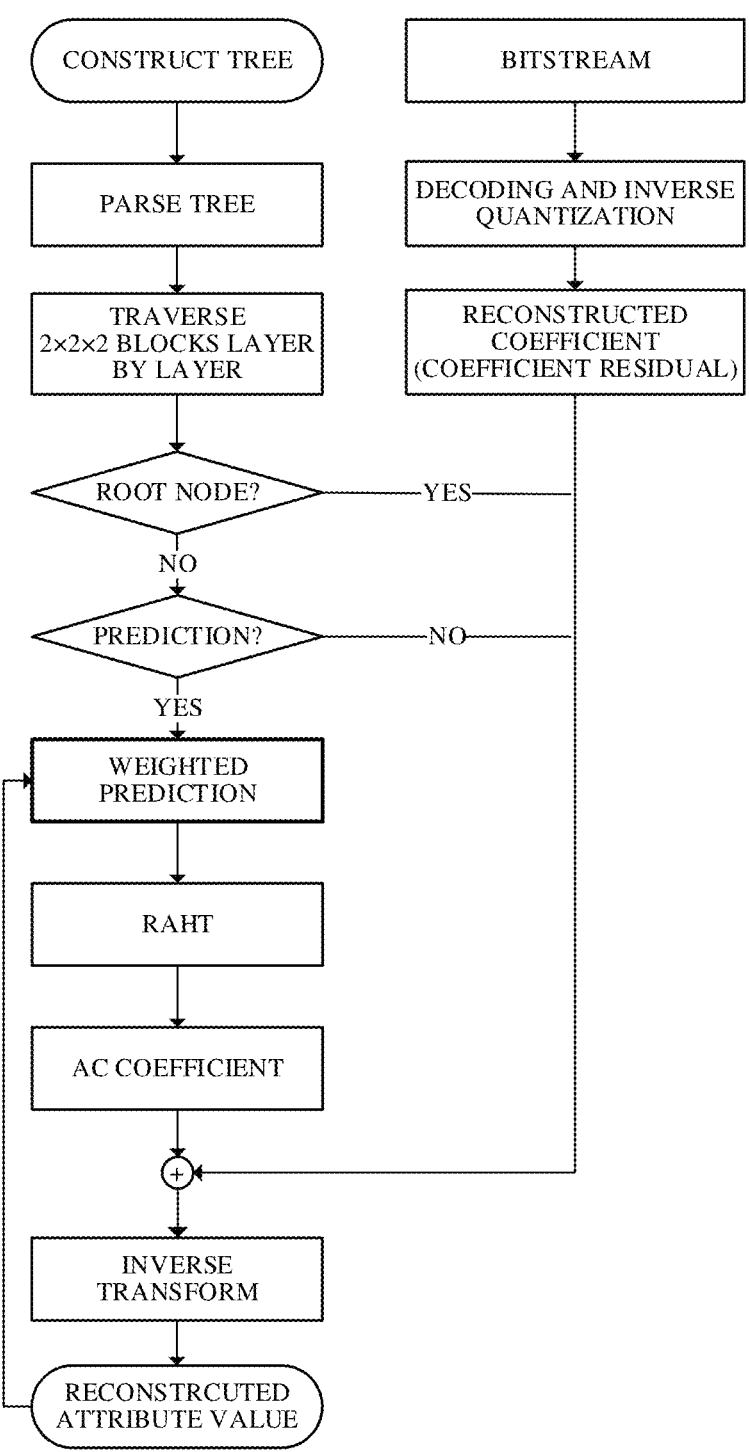
FIG. 8 is a flowchart of RAHT decoding.

In an embodiment, FIG. 8 is a flowchart of RAHT decoding. As illustrated in FIG. 8, at a decoding end, an octree structure is constructed from the bottom to the top according to geometry information, and then parsing is performed layer by layer from a root node. A transform unit of RAHT is a 2×2×2 block, which is defined as a to-be-decoded node, i.e., a current node (a current parent-level node). In addition, a bitstream is decoded, and then a reconstructed coefficient (coefficient residual) is obtained through inverse quantization.

If the to-be-decoded node is the root node, the prediction is skipped, and attribute reconstruction information is directly obtained by performing inverse transform on reconstructed DC and AC coefficients.

If the to-be-decoded node is not the root node, whether to predict a current to-be-decoded node is determined according to the number of neighbours of a grandparent node and a parent node.

If the prediction is needed, neighbour search and weighted prediction are performed on each occupied child node of the current to-be-decoded node, and an AC coefficient of a prediction value is obtained through transform. The AC coefficient of the prediction value is added to a reconstructed AC coefficient residual obtained through decoding, so as to obtain a reconstructed AC coefficient corresponding to an original attribute value. Finally, the attribute reconstruction information is obtained through inverse transform. If the prediction is skipped, the attribute reconstruction information is directly obtained by performing inverse transform on the reconstructed coefficient obtained through decoding.

Figure 9:
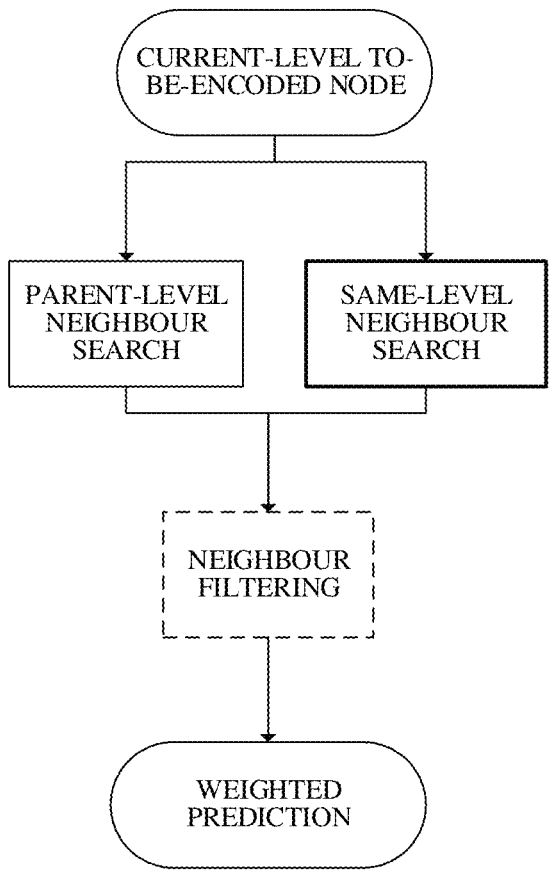
FIG. 9 is a schematic diagram of a prediction method.

Further, a new prediction scheme is proposed in embodiments of the disclosure. On the basis of upsampled prediction, same-level neighbouring nodes are introduced for prediction. FIG. 9 is a schematic diagram of a prediction method. As illustrated in FIG. 9, the prediction process mainly includes operations of parent-level neighbour search, same-level neighbour search, neighbour filtering, and weighted prediction.

During searching for parent-level neighbours (parent-level neighbouring nodes), parent-level neighbours of a current-level to-be-encoded node (or to-be-decoded node, i.e., a current node) are searched, the range of which includes: the current node (a current parent-level node) and coplanar or collinear neighbouring nodes of the current node. Reconstructed attribute information of existing neighbouring nodes is recorded, where $A_{recP}$ represents reconstructed attribute information of a current parent node, $A_{recPface}$ represents reconstructed attribute information of a coplanar neighbouring node of the current parent node, and $A_{recPline}$ represents reconstructed attribute information of a collinear neighbouring node of the current node.

Further, during searching for same-level neighbours (same-level neighbouring nodes), same-level neighbours of the current-level to-be-encoded node are searched, the range of which includes: neighbouring nodes that are coplanar or collinear with a corresponding child node (current node) of the to-be-encoded node among encoded (or decoded) same-level nodes. Reconstructed attribute information of existing neighbouring child nodes is recorded, where $A_{recSface}$ represents reconstructed attribute information of the coplanar neighbouring node, and $A_{recSline}$ represents reconstructed attribute information of the collinear neighbouring node.

Further, during neighbour filtering, according to an attribute value of the current parent node, two prediction thresholds lim i tLow and lim i tHigh are set for filtering neighbours found through the parent-level and same-level search, or for limiting the number of neighbours, thereby improving the accuracy of the prediction.

Further, during weighted prediction, filtered neighbours are used for weighted prediction of the current node (or each child node belonging to the same transform unit block as the current node). A weight of each neighbour is related to the Euclidean distance. A specific calculation formula for an attribute prediction value is illustrated in the above formula (3).

In the above, $A_{pre}$ is the attribute prediction value of the child node of the current node. $W_{recP}$, $W_{recPface}$, $W_{recPline}$, $W_{recSface}$, and $W_{recSline}$ are weights corresponding to neighbours $A_{recP}$, $A_{recPface}$, $A_{recPline}$, $A_{recSface}$, and $A_{recSline}$, respectively, where the weight is related to the Euclidean distance. $n_1$, $n_2$, $n_3$, and $n_4$ represent the number of the found parent-level coplanar neighbours, parent-level collinear neighbours, same-level coplanar neighbours, and same-level collinear neighbours of the child node, respectively.

It may be understood that, the point cloud coding method provided in embodiments of the disclosure can make full use of the spatial correlation of the point cloud, and introduce same-level neighbours for predicting the current node during prediction of attribute information. Therefore, the encoding efficiency of G-PCC can be further improved.

It may be noted that, BD-AttrRate under lossy compression of attribute information represents the percentage of coding bitrates saved (negative BD-Rate) or increased (positive BD-Rate) achieved with the point cloud coding method provided in embodiments of the disclosure compared to coding bitrates achieved in the prior art, under the same coding quality, compared with common coding methods, as follows.

Exemplarily, in embodiments of the disclosure, $W_{recP}$, $W_{recPface}$, $W_{recPline}$, $W_{recSface}$, and $W_{recSline}$ are 4, 2, 0, 2, 0, respectively. That is, a first weight, a second weight, a third weight, a fourth weight, and a fifth weight are 4, 2, 0, 2, 0, respectively. The performance gains are illustrated in Table 1 and Table 2.

TABLE 1

| BD-AttrRate under lossless geometry and lossy attribute | | | |
|---|---|---|---|
| | BD-AttrRate (%) | | |
| C1_ai | Luma | Chroma Cb | Chroma Cr |
| Solid average | −4.6% | −5.3% | −5.1% |
| Dense average | −1.6% | −3.4% | −3.8% |
| Sparse average | −2.5% | −3.3% | −2.9% |
| Scant average | | | |
| Overall average | | | |

TABLE 2

| BD-AttrRate under lossy geometry and lossy attribute | | | |
|---|---|---|---|
| | BD-AttrRate (%) | | |
| C2_ai | Luma | Chroma Cb | Chroma Cr |
| Solid average | −4.0% | −4.9% | −3.8% |
| Dense average | −2.9% | −3.6% | −4.1% |
| Sparse average | −3.3% | −3.4% | −2.8% |
| Scant average | | | |
| Overall average | | | |

Exemplarily, in embodiments of the disclosure, $W_{recP}$, $W_{recPface}$, $W_{recPline}$, $W_{recSface}$, and $W_{recSline}$ are 4, 2, 1, 2, 1, respectively. That is, the first weight, the second weight, the third weight, the fourth weight, and the fifth weight are 4, 2, 1, 2, 1, respectively. The performance gains are illustrated in Table 3 and Table 4.

TABLE 3

| BD-AttrRate under lossless geometry and lossy attribute | | | |
|---|---|---|---|
| | BD-AttrRate (%) | | |
| C1_ai | Luma | Chroma Cb | Chroma Cr |
| Solid average | −3.4% | −2.3% | −1.6% |
| Dense average | −2.4% | −1.0% | 0.1% |
| Sparse average | −1.1% | −0.2% | 0.1% |
| Scant average | −1.5% | −0.3% | 0.1% |
| Overall average | −2.0% | −0.8% | −0.2% |

TABLE 4

| BD-AttrRate under lossy geometry and lossy attribute | | | |
|---|---|---|---|
| | BD-AttrRate (%) | | |
| C2_ai | Luma | Chroma Cb | Chroma Cr |
| Solid average | −3.0% | −2.0% | −1.3% |
| Dense average | −2.7% | −1.6% | −1.1% |
| Sparse average | −1.8% | −0.5% | −0.3% |
| Scant average | −1.5% | −0.1% | 0.2% |
| Overall average | −2.2% | −0.9% | −0.5% |

Exemplarily, in embodiments of the disclosure, $W_{recP}$, $W_{recPface}$, $W_{recPline}$, $W_{recSface}$, and $W_{recSline}$ are 4, 2, 1, 2, 1, respectively. That is, the first weight, the second weight, the third weight, the fourth weight, and the fifth weight are 4, 2, 1, 2, 1, respectively. In addition, the number of neighbours participating in the prediction is limited. For example, $n_1+n_3 \le 6$ and/or $n_2+n_4 \le 12$. In other words, up to 6 coplanar neighbours are used, and up to 12 collinear neighbours are used (same-level neighbours can be used preferentially). The performance gains are illustrated in Table 5 and Table 6.

TABLE 5

| BD-AttrRate under lossless geometry and lossy attribute | | | |
|---|---|---|---|
| | BD-AttrRate (%) | | |
| C1_ai | Luma | Chroma Cb | Chroma Cr |
| Solid average | −3.0% | −2.7% | −2.3% |
| Dense average | −0.7% | −1.0% | −1.4% |

TABLE 5-continued

BD-AttrRate under lossless geometry and lossy attribute

| C1_ai | BD-AttrRate (%) | | |
| --- | --- | --- | --- |
| | Luma | Chroma Cb | Chroma Cr |
| Sparse average | −1.6% | −1.1% | −0.6% |
| Scant average | −1.1% | −0.3% | −0.7% |
| Overall average | −1.5% | −1.1% | −1.2% |

TABLE 6

BD-AttrRate under lossy geometry and lossy attribute

| C2_ai | BD-AttrRate (%) | | |
| --- | --- | --- | --- |
| | Luma | Chroma Cb | Chroma Cr |
| Solid average | −2.0% | −1.6% | −0.8% |
| Dense average | −1.2% | −1.4% | −1.2% |
| Sparse average | −2.1% | −0.5% | 0.0% |
| Scant average | −1.2% | −0.3% | −0.5% |
| Overall average | −1.5% | −0.9% | −0.6% |

A point cloud coding method is disclosed in embodiments of the disclosure. A decoder determines reconstructed attribute information of occupied neighbouring nodes of a current node and reconstructed attribute information of occupied same-level neighbouring child nodes of a child node of the current node. The decoder determines an attribute prediction value of the child node of the current node according to the reconstructed attribute information of the occupied neighbouring nodes and the reconstructed attribute information of the occupied same-level neighbouring child nodes of the child node of the current node. The decoder determines a first transformed coefficient by performing RAHT on the attribute prediction value, and determines reconstructed attribute information of the child node of the current node according to the first transformed coefficient. An encoder determines reconstructed attribute information of occupied neighbouring nodes of a current node and reconstructed attribute information of occupied same-level neighbouring child nodes of a child node of the current node. The encoder determines an attribute prediction value of the child node of the current node according to the reconstructed attribute information of the occupied neighbouring nodes and the reconstructed attribute information of the occupied same-level neighbouring child nodes of the child node of the current node. The encoder determines a first transformed coefficient by performing RAHT on the attribute prediction value, and determines a quantized coefficient residual of the child node of the current node according to the first transformed coefficient. The encoder signals the quantized coefficient residual into a bitstream. That is to say, in embodiments of the disclosure, for the RAHT process, during prediction of attribute information of the current node, the reconstructed attribute information of the occupied neighbouring nodes of the current node and the reconstructed attribute information of the occupied same-level neighbouring child nodes of the child node of the current node can be used to determine the attribute prediction value of the child node of the current node. In other words, on the basis of upsampled prediction, same-level neighbouring nodes of the current node and same-level neighbouring child nodes of the child node are introduced for prediction of the attribute information, that is, parent-level neighbouring nodes and the same-level neighbouring child nodes of the child node of the current node are introduced for prediction of the attribute information. As such, the coding efficiency and the video compression performance can be improved.

Based on the above embodiments, a point cloud encoding method and a point cloud decoding method are provided in yet another embodiment of the disclosure.

At an encoding end or decoding end, whether to enable a prediction mode for RAHT may be determined according to prediction flag information, for example, a flag raht_prediction_enabled_flag. If the prediction flag information indicates to enable the prediction mode for RAHT, for example, the value of raht_prediction_enabled_flag is a first value (e.g., 1), then whether to enable neighbour attribute prediction for a current block may be determined according to a result of comparing the number of neighbouring blocks of the current block (a current node) and the number of parent neighbouring blocks of the current block with a preset value (a first threshold and a second threshold).

That is to say, at the encoding end or decoding end, if RAHT prediction is configured as enabled (raht_prediction_enabled_flag=1), whether to enable neighbour attribute prediction for a current block may be determined according to a result of comparing the number of neighbouring blocks of the current block and the number of parent neighbouring blocks of the current block with a preset value. If the current block is a root node, prediction will be not enabled (i.e., lvl>0 is required). A relationship between the current block and each of a parent block and a neighbouring block can be determined according to a level number lvl of a transform block in a transform tree and block coordinates (bs, bt, bv).

Exemplarily, the related standard syntax is as follows:
RahtPredEligible[lvl][bs][bt][bv]:=raht_prediction_enabled_flag
&& lvl>0
&& lvl<RahtRootLvl
&& RahtNeighCnt[lvl][bs][bt][bv]≥raht_prediction_samples_min
&& RahtNeighCntMinAncestor[lvl][bs][bt][bv]≥ raht_prediction_subtree_min In the above, RahtNeighCnt refers to the count of neighbouring blocks, i.e., the number of neighbouring blocks, and RahtNeighCntMinAncestor refers to the count of parent blocks, i.e., the number of parent neighbouring blocks.

Further, if the current block satisfies a condition for enabling neighbour attribute prediction, neighbour prediction is performed on a subblock in the current block by using an (parent-level) attribute value of a neighbouring block of the current block and an (same-level or sub-level) attribute value of a subblock of the neighbouring block. The attribute value of the neighbouring block is an attribute value obtained by normalizing a DC coefficient of the neighbouring block, and the attribute value of the subblock of the neighbouring block is an attribute value obtained by normalizing the DC coefficient of the subblock of the neighbouring block.

Exemplarily, the related standard syntax is as follows:

$$RahtDcNorm[lvl][bs][bt][bv] := DivExp2Fz((coeff \gg wShift) \times$$

$$(IntRecipSqrt(w) \gg 25 - wShift), 30)$$

where $$w := RahtBlkWeight[lvl][bs][bt][bv]$$

-continued $$coeff := RahtDcCoeff[lvl][bs][bt][bv]$$

$$wShift := w > 1024?IntLog2(w-1) \gg 1:0$$

In the above, RahtDcNorm[lvl][bs][bt][bv] is a normalized attribute value of a block at any/v/level of the transform tree and with block coordinates (bs, bt, bv).

It may be noted that, the neighbouring block of the current block includes: the current block itself, a neighbouring block coplanar with a to-be-encoded subblock in the current block, and a neighbouring block collinear with the to-be-encoded sub-block in the current block. A neighbouring subblock of the current block includes: an encoded subblock in the neighbouring block that is coplanar or collinear with a to-be-predicted subblock in the current block.

That is to say, during searching for parent-level neighbouring nodes of the current node, a specific search range includes: the current node (a current parent-level node) and coplanar or collinear neighbouring nodes of the current node. Reconstructed attribute information of existing neighbouring nodes is recorded, where $A_{recP}$ represents reconstructed attribute information of the current node, $A_{recPface}$ represents reconstructed attribute information of the neighbouring node coplanar with the current node, and $A_{recPline}$ represents reconstructed attribute information of the neighbouring node collinear with the current node. During searching for same-level neighbouring nodes of a child node of the current node, a specific search range includes neighbouring child nodes that are coplanar or collinear with the child node of the current node. Reconstructed attribute information of existing neighbouring nodes is recorded, where $A_{recSface}$ represents reconstructed attribute information of the neighbouring node coplanar with the child node of the current node, and $A_{recSline}$ represents reconstructed attribute information of the neighbouring node collinear with the child node of the current node.

Further, an attribute value of a coplanar or collinear block at any/v/level and with block coordinates (Bs, Bt, Bv) is RahtDcNorm[Lvl][Bs+ds][Bs+dt][Bs+dv], where ds, dt, and dv may take values of −1, 0, and 1 respectively, and abs(ds)+abs(dt)+abs(dv)<3.

Further, a prediction weight of the neighbouring block of the current block and a prediction weight of the subblock of the neighbouring block are determined. A weight of the current block itself is w1 (a first weight), a weight of a coplanar neighbouring block is w2 (a second weight), and a weight of a collinear neighbouring block is w3 (a third weight). If an ratio of an attribute of a certain coplanar or collinear neighbour to an attribute of the current block is less than a certain threshold 1 or is greater than a certain threshold 2, then a weight of the coplanar or collinear neighbour is set to 0 (a position of the neighbour is represented by RahtPredExcluded[ds][dt][dv]). A weight of the encoded subblock in the neighbouring block that is coplanar with the to-be-predicted subblock in the current block is w4 (a fourth weight), and a weight of the encoded subblock in the neighbouring block that is collinear with the to-be-predicted subblock in the current block is w5 (a fifth weight). The same-level or sub-level coplanar or collinear relationship can be determined by using Morton code of a block.

A weight of a same-level neighbouring block with coordinates [Bs+ds][Bt+dt][Bv+dv] is: w[ds][dt][dv]:=RahtPredExcluded[ds][dt][dv]?0:RahtPredWeight[ds][dt][dv][m].

According to different values of ds, dt, and dv, the value of RahtPredWeight[ds][dt][dv][m] is one of 0, w1, w2, and w3.

A weight of the subblock of the neighbouring block with coordinates [Bs+ds][Bt+dt][Bv+dv] is: w[((Bs+ds)<<1)+ds2][((Bt+dt)<<1)+dt2][((Bv+dv)<<1)+dv2]:=RahtPredWeight[((Bs+ds)<<1)+ds2][((Bt+dt)<<1)+dt2][((Bv+dv)<<1)+dv2][m]. (ds2, dt2, dv2) are relative coordinates of the neighbouring subblock in the neighbouring block. According to different values of (ds2, dt2, dv2), the value of RahtPredWeight[((Bs+ds)<<1)+ds2][((Bt+dt)<<1)+dt2][((Bv+dv)<<1)+dv2][m] is one of 0, w4, and w5.

Further, according to attribute values of the selected same-level and sub-level blocks (which may also be referred to as parent-level and same-level attribute values of the subblocks) corresponding weights are obtained based on relative positions of the same-level and sub-level blocks, and weighted average calculation is performed on attributes to obtain an attribute prediction value RahtPred[m] of each to-be-encoded subblock in the current block, i.e., an attribute prediction value of the child node of the current node. Here, m is a current subblock index from 0 to 7.

A point cloud coding method is disclosed in embodiments of the disclosure. A decoder determines reconstructed attribute information of occupied neighbouring nodes of a current node and reconstructed attribute information of occupied same-level neighbouring child nodes of a child node of the current node. The decoder determines an attribute prediction value of the child node of the current node according to the reconstructed attribute information of the occupied neighbouring nodes and the reconstructed attribute information of the occupied same-level neighbouring child nodes of the child node of the current node. The decoder determines a first transformed coefficient by performing RAHT on the attribute prediction value, and determines reconstructed attribute information of the child node of the current node according to the first transformed coefficient. An encoder determines reconstructed attribute information of occupied neighbouring nodes of a current node and reconstructed attribute information of occupied same-level neighbouring child nodes of a child node of the current node. The encoder determines an attribute prediction value of the child node of the current node according to the reconstructed attribute information of the occupied neighbouring nodes and the reconstructed attribute information of the occupied same-level neighbouring child nodes of the child node of the current node. The encoder determines a first transformed coefficient by performing RAHT on the attribute prediction value, and determines a quantized coefficient residual of the child node of the current node according to the first transformed coefficient. The encoder signals the quantized coefficient residual into a bitstream. That is to say, in embodiments of the disclosure, for the RAHT process, during prediction of attribute information of the current node, the reconstructed attribute information of the occupied neighbouring nodes of the current node and the reconstructed attribute information of the occupied same-level neighbouring child nodes of the child node of the current node can be used to determine the attribute prediction value of the child node of the current node. In other words, on the basis of upsampled prediction, same-level neighbouring nodes of the current node and same-level neighbouring child nodes of the child node are introduced for prediction of the attribute information, that is, parent-level neighbouring nodes and the same-level neighbouring child nodes of the child node of the current node are introduced for prediction of the attribute information. As such, the coding efficiency and the video compression performance can be improved.

Figure 10:
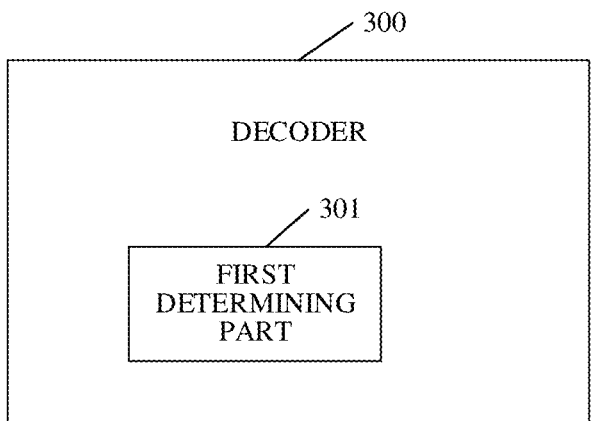
FIG. 10 is a first schematic diagram of a structure of a decoder.

Based on the above embodiments, in yet another embodiment of the disclosure, FIG. 10 is a first schematic diagram of a structure of a decoder. As illustrated in FIG. 10, a decoder 300 provided in embodiments of the disclosure includes a first determining part 301.

The first determining part 301 is configured to determine reconstructed attribute information of occupied neighbouring nodes of a current node and reconstructed attribute information of occupied same-level neighbouring child nodes of a child node of the current node. The first determining part 301 is further configured to determine an attribute prediction value of the child node of the current node according to the reconstructed attribute information of the occupied neighbouring nodes and the reconstructed attribute information of the occupied same-level neighbouring child nodes of the child node of the current node. The first determining part 301 is further configured to determine a first transformed coefficient by performing RAHT on the attribute prediction value, and determine reconstructed attribute information of the child node of the current node according to the first transformed coefficient.

Further, in embodiments of the disclosure, the first determining part 301 is configured to determine the number of occupied neighbours of a parent node of a current node and the number of occupied neighbours of the current node, if the current node is not a root node. The first determining part 301 is further configured to determine reconstructed attribute information of occupied neighbouring nodes of the current node and reconstructed attribute information of occupied same-level neighbouring child nodes of a child node of the current node, if the number of the occupied neighbours of the parent node is greater than or equal to a first threshold and the number of the occupied neighbours of the current node is greater than or equal to a second threshold. The first determining part 301 is further configured to determine an attribute prediction value of the child node of the current node according to the reconstructed attribute information of the occupied neighbouring nodes and the reconstructed attribute information of the occupied same-level neighbouring child nodes of the child node of the current node. The first determining part 301 is further configured to determine a first transformed coefficient by performing RAHT on the attribute prediction value, and determine reconstructed attribute information of the child node of the current node according to the first transformed coefficient.

Figure 11:
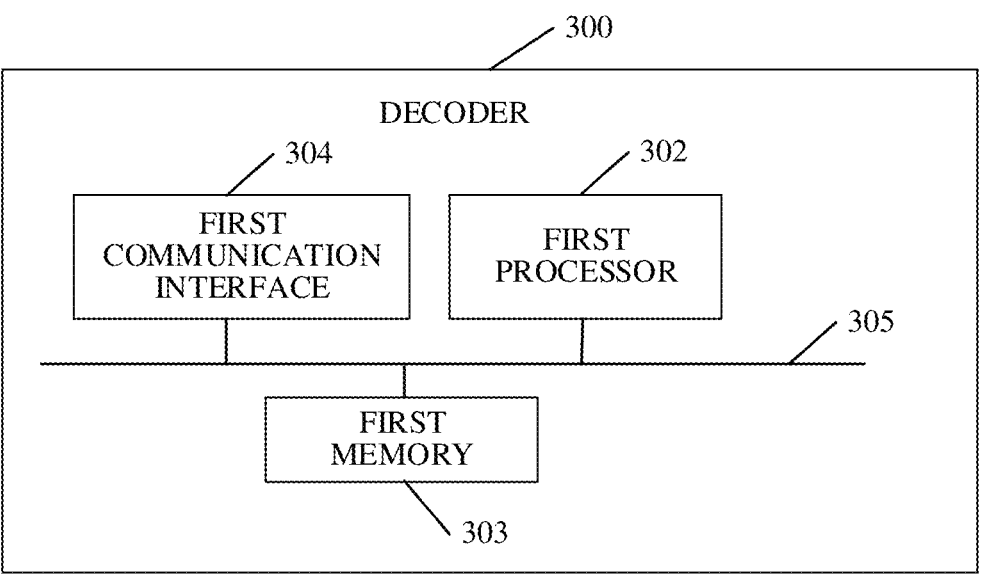
FIG. 11 is a second schematic diagram of a structure of a decoder.

FIG. 11 is a second schematic diagram of a structure of a decoder. As illustrated in FIG. 11, a decoder 300 provided in embodiments of the disclosure may further include a first processor 302, a first memory 303 storing instructions executable by the first processor 302, a first communication interface 304, and a first bus 305 for connecting the first processor 302, the first memory 303, and the first communication interface 304.

Further, in embodiments of the disclosure, the above first processor 302 is configured to determine reconstructed attribute information of occupied neighbouring nodes of a current node and reconstructed attribute information of occupied same-level neighbouring child nodes of a child node of the current node. The first processor 302 is further configured to determine an attribute prediction value of the child node of the current node according to the reconstructed attribute information of the occupied neighbouring nodes and the reconstructed attribute information of the occupied same-level neighbouring child nodes of the child node of the current node. The first processor 302 is further configured to determine a first transformed coefficient by performing RAHT on the attribute prediction value, and determine reconstructed attribute information of the child node of the current node according to the first transformed coefficient.

Further, in embodiments of the disclosure, the above first processor 302 is configured to determine the number of occupied neighbours of a parent node of a current node and the number of occupied neighbours of the current node, if the current node is not a root node. The first processor 302 is further configured to determine reconstructed attribute information of occupied neighbouring nodes of the current node and reconstructed attribute information of occupied same-level neighbouring child nodes of a child node of the current node, if the number of the occupied neighbours of the parent node is greater than or equal to a first threshold and the number of the occupied neighbours of the current node is greater than or equal to a second threshold. The first processor 302 is further configured to determine an attribute prediction value of the child node of the current node according to the reconstructed attribute information of the occupied neighbouring nodes and the reconstructed attribute information of the occupied same-level neighbouring child nodes of the child node of the current node. The first processor 302 is further configured to determine a first transformed coefficient by performing RAHT on the attribute prediction value, and determine reconstructed attribute information of the child node of the current node according to the first transformed coefficient.

Figure 12:
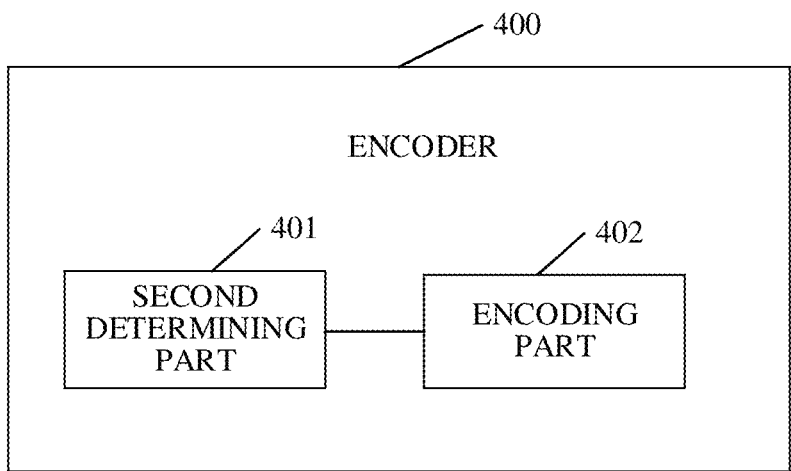
FIG. 12 is a first schematic diagram of a structure of an encoder.

FIG. 12 is a first schematic diagram of a structure of an encoder. As illustrated in FIG. 12, an encoder 400 provided in embodiments of the disclosure may include a second determining part 401 and an encoding part 402.

The second determining part 401 is configured to determine reconstructed attribute information of occupied neighbouring nodes of a current node and reconstructed attribute information of occupied same-level neighbouring child nodes of a child node of the current node. The second determining part 401 is further configured to determine an attribute prediction value of the child node of the current node according to the reconstructed attribute information of the occupied neighbouring nodes and the reconstructed attribute information of the occupied same-level neighbouring child nodes of the child node of the current node. The second determining part 401 is further configured to determine a first transformed coefficient by performing RAHT on the attribute prediction value, and determine a quantized coefficient residual of the child node of the current node according to the first transformed coefficient. The encoding part 402 is configured to signal the quantized coefficient residual into a bitstream.

Further, in embodiments of the disclosure, the second determining part 401 is configured to determine the number of occupied neighbours of a parent node of a current node and the number of occupied neighbours of the current node, if the current node is not a root node. The second determining part 401 is further configured to determine reconstructed attribute information of occupied neighbouring nodes of the current node and reconstructed attribute information of occupied same-level neighbouring child nodes of a child node of the current node, if the number of the occupied neighbours of the parent node is greater than or equal to a first threshold and the number of the occupied neighbours of the current node is greater than or equal to a second threshold. The second determining part 401 is further configured to determine an attribute prediction value of the child node of the current node according to the reconstructed attribute information of the occupied neighbouring nodes and the reconstructed attribute information of the occupied same-level neighbouring child nodes of the child node of the current node. The second determining part 401 is further configured to determine a first transformed coefficient by performing RAHT on the attribute prediction value, and determine a coefficient residual value of the child node of the current node according to the first transformed coefficient. The encoding part 402 is configured to signal the quantized coefficient residual into a bitstream.

Figure 13:
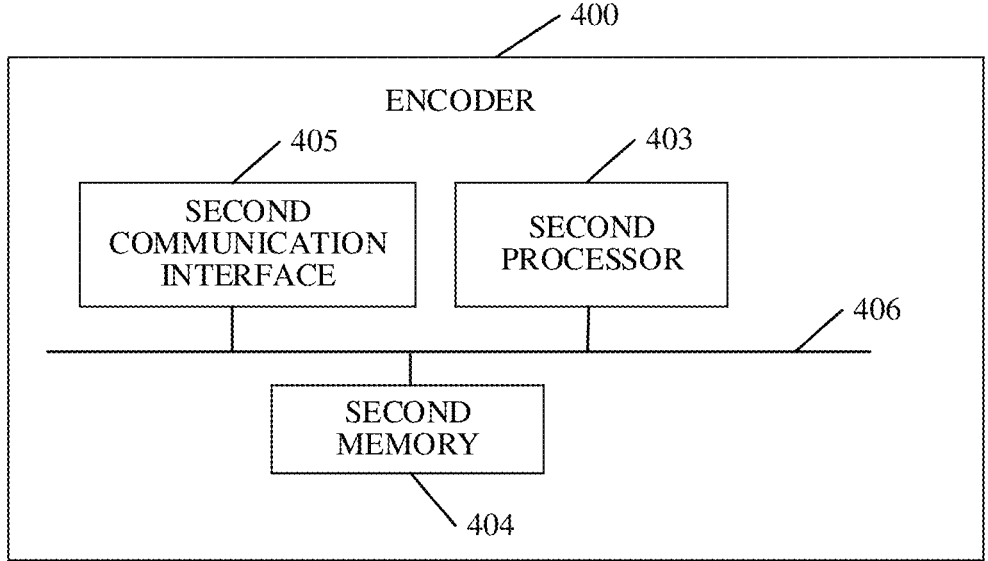
FIG. 13 is a second schematic diagram of a structure of an encoder.

FIG. 13 is a second schematic diagram of a structure of an encoder. As illustrated in FIG. 13, an encoder 400 provided in embodiments of the disclosure may further include a second processor 403, a second memory 404 storing instructions executable by the second processor 403, a second communication interface 405, and a second bus 406 for connecting the second processor 403, the second memory 404, and the second communication interface 405.

Further, in embodiments of the disclosure, the above second processor 403 is configured to determine reconstructed attribute information of occupied neighbouring nodes of a current node and reconstructed attribute information of occupied same-level neighbouring child nodes of a child node of the current node. The second processor 403 is further configured to determine an attribute prediction value of the child node of the current node according to the reconstructed attribute information of the occupied neighbouring nodes and the reconstructed attribute information of the occupied same-level neighbouring child nodes of the child node of the current node. The second processor 403 is further configured to determine a first transformed coefficient by performing RAHT on the attribute prediction value, and determine a quantized coefficient residual of the child node of the current node according to the first transformed coefficient. The second processor 403 is further configured to signal the quantized coefficient residual into a bitstream.

Further, in embodiments of the disclosure, the above second processor 403 is configured to determine the number of occupied neighbours of a parent node of a current node and the number of occupied neighbours of the current node, if the current node is not a root node. The second processor 403 is further configured to determine reconstructed attribute information of occupied neighbouring nodes of the current node and reconstructed attribute information of occupied same-level neighbouring child nodes of a child node of the current node, if the number of the occupied neighbours of the parent node is greater than or equal to a first threshold and the number of the occupied neighbours of the current node is greater than or equal to a second threshold. The second processor 403 is further configured to determine an attribute prediction value of the child node of the current node according to the reconstructed attribute information of the occupied neighbouring nodes and the reconstructed attribute information of the occupied same-level neighbouring child nodes of the child node of the current node. The second processor 403 is further configured to determine a first transformed coefficient by performing RAHT on the attribute prediction value, and determine a coefficient residual value of the child node of the current node according to the first transformed coefficient. The second processor 403 is further configured to signal the coefficient residual value into a bitstream.

It may be understood that in embodiments of the disclosure, the "unit" may be part of the circuitry, part of the processor, part of the program or software, etc., and may be a module, or may be non-modular. Furthermore, the components in the embodiments may be integrated in a single processing unit, or each unit may be physically separate, or two or more units may be integrated in a single unit. The above integrated units may be implemented either in the form of hardware or in the form of software function modules.

If the integrated unit is implemented as a software function module and not sold or used as a stand-alone product, the integrated unit may be stored in a computer-readable storage medium. Based on such understanding, the technical solutions of the embodiments in essential, or a part that contributes to the prior art, or all or part of the technical solutions, may be embodied in the form of a software product. The software product is stored in a storage medium and includes a number of instructions to enable a computer device (which may be a personal computer, a server, or a network device, etc.) or processor to perform all or part of the operations of the method described in the embodiments. The aforementioned storage medium includes a USB stick, a removable hard disk, a read only memory (ROM), a random access memory (RAM), a diskette or a CD-ROM, and other media that may store program codes.

It will be appreciated that the memory in embodiments of the disclosure may be a transitory memory or non-transitory memory, or may include both transitory and non-transitory memory. In particular, the non-transitory memory may be an ROM, a programmable ROM (PROM), an erasable programmable read-only memory (EPROM), an electrically erasable programmable read-only memory (EEPROM), or a flash memory. The transitory memory may be an RAM, which is used as an external cache. By way of illustration, but not limitation, many forms of RAM are available, such as a static RAM (SRAM), a dynamic RAM (DRAM), a synchronous DRAM (SDRAM), a double data rate synchronous random access memory (DDRSDRAM), an enhanced SDRAM (ESDRAM), a synchlink DRAM (SLDRAM), and a direct Rambus RAM (DRRAM). The memory of the system and method described in this disclosure is intended to include, but is not limited to, these and any other suitable types of memory.

The processor may be an integrated circuit chip with signal processing capabilities. In implementation, the operations in the above method may be accomplished by integrated logic circuitry in the hardware of the processor or by instructions in the form of software. The processor described above may be a general purpose processor, a digital signal processor (DSP), an application specific integrated circuit (ASIC), a field programmable gate array (FPGA), or other programmable logic device, discrete gate or transistor logic device, discrete hardware component. The various methods, steps and logic block diagrams of the disclosure in embodiments of the disclosure may be implemented or performed. The general purpose processor may be a microprocessor or the processor may also be any conventional processor, etc. The operations in the method disclosed in conjunction with embodiments of the disclosure may be performed directly by the hardware decoder processor or by a combination of hardware and software modules in the decoder processor. The software module may be located in a random memory, flash memory, read-only memory, programmable read-only memory or electrically erasable programmable memory, registers and other storage media well established in the art. The storage medium is located in the memory, and the processor reads the information in the memory and completes the operations of the above method in combination with its hardware.

It will be appreciated that these embodiments described in this disclosure may be implemented in hardware, software, firmware, middleware, microcode, or combinations thereof. For hardware implementations, the processing unit may be implemented in one or more ASIC, DSP, DSP Device, programmable logic device (PLD), FPGA, general purpose processor, controller, microcontroller, microprocessor, other electronic unit for performing the functions described in this disclosure, or a combination thereof. For software implementations, the technology described in this disclosure may be implemented by means of modules (e.g. procedures, functions, etc.) that perform the functions described in this disclosure. The software code may be stored in a memory and executed by a processor. The memory may be implemented in the processor or outside the processor.

A codec is provided in embodiments of the disclosure. A decoder determines reconstructed attribute information of occupied neighbouring nodes of a current node and reconstructed attribute information of occupied same-level neighbouring child nodes of a child node of the current node. The decoder determines an attribute prediction value of the child node of the current node according to the reconstructed attribute information of the occupied neighbouring nodes and the reconstructed attribute information of the occupied same-level neighbouring child nodes of the child node of the current node. The decoder determines a first transformed coefficient by performing RAHT on the attribute prediction value, and determines reconstructed attribute information of the child node of the current node according to the first transformed coefficient. An encoder determines reconstructed attribute information of occupied neighbouring nodes of a current node and reconstructed attribute information of occupied same-level neighbouring child nodes of a child node of the current node. The encoder determines an attribute prediction value of the child node of the current node according to the reconstructed attribute information of the occupied neighbouring nodes and the reconstructed attribute information of the occupied same-level neighbouring child nodes of the child node of the current node. The encoder determines a first transformed coefficient by performing RAHT on the attribute prediction value, and determines a quantized coefficient residual of the child node of the current node according to the first transformed coefficient. The encoder signals the quantized coefficient residual into a bitstream. That is to say, in embodiments of the disclosure, for the RAHT process, during prediction of attribute information of the current node, the reconstructed attribute information of the occupied neighbouring nodes of the current node and the reconstructed attribute information of the occupied same-level neighbouring child nodes of the child node of the current node can be used to determine the attribute prediction value of the child node of the current node. In other words, on the basis of upsampled prediction, same-level neighbouring nodes of the current node and same-level neighbouring child nodes of the child node are introduced for prediction of the attribute information, that is, parent-level neighbouring nodes and the same-level neighbouring child nodes of the child node of the current node are introduced for prediction of the attribute information. As such, the coding efficiency and the video compression performance can be improved.

A computer storage medium is provided in embodiments of the disclosure. The computer storage medium is applied to the encoder 300 and stores a point cloud decoding program. The point cloud decoding program, when executed by a processor, is operable to implement the method described in any one of the preceding embodiments.

Specifically, program instructions corresponding to a point cloud decoding method in this embodiment can be stored in a storage medium such as an optical disk, a hard disk, and a USB flash disk. When the program instructions corresponding to the point cloud decoding method in the storage medium are read or executed by an electronic device, the following operations are implemented.

Reconstructed attribute information of occupied neighbouring nodes of a current node and reconstructed attribute information of occupied same-level neighbouring child nodes of a child node of the current node are determined. An attribute prediction value of the child node of the current node is determined according to the reconstructed attribute information of the occupied neighbouring nodes and the reconstructed attribute information of the occupied same-level neighbouring child nodes of the child node of the current node. A first transformed coefficient is determined by performing RAHT on the attribute prediction value, and reconstructed attribute information of the child node of the current node is determined according to the first transformed coefficient.

When the program instructions corresponding to a point cloud decoding method in the storage medium are read or executed by an electronic device, the following operations are implemented.

If a current node is not a root node, the number of occupied neighbours of a parent node of the current node and the number of occupied neighbours of the current node are determined. If the number of the occupied neighbours of the parent node is greater than or equal to a first threshold and the number of the occupied neighbours of the current node is greater than or equal to a second threshold, reconstructed attribute information of occupied neighbouring nodes of the current node and reconstructed attribute information of occupied same-level neighbouring child nodes of a child node of the current node are determined. An attribute prediction value of the child node of the current node is determined according to the reconstructed attribute information of the occupied neighbouring nodes and the reconstructed attribute information of the occupied same-level neighbouring child nodes of the child node of the current node. A first transformed coefficient is determined by performing RAHT on the attribute prediction value, and reconstructed attribute information of the child node of the current node is determined according to the first transformed coefficient.

A computer storage medium is provided in embodiments of the disclosure. The computer storage medium is applied to the decoder 400 and stores a point cloud encoding program. The point cloud encoding program, when executed by a processor, is operable to implement the method described in any one of the preceding embodiments.

Specifically, program instructions corresponding to a point cloud encoding method in this embodiment can be stored in a storage medium such as an optical disk, a hard disk, and a USB flash disk. When the program instructions corresponding to the point cloud encoding method in the storage medium are read or executed by an electronic device, the following operations are implemented.

Reconstructed attribute information of occupied neighbouring nodes of a current node and reconstructed attribute information of occupied same-level neighbouring child nodes of a child node of the current node are determined. An attribute prediction value of the child node of the current node is determined according to the reconstructed attribute information of the occupied neighbouring nodes and the reconstructed attribute information of the occupied same-level neighbouring child nodes of the child node of the current node. A first transformed coefficient is determined by performing RAHT on the attribute prediction value, and a quantized coefficient residual of the child node of the current node is determined according to the first transformed coefficient. The quantized coefficient residual is signalled into a bitstream.

When the program instructions corresponding to a point cloud encoding method in the storage medium are read or executed by an electronic device, the following operations are implemented.

If a current node is not a root node, the number of occupied neighbours of a parent node of the current node and the number of occupied neighbours of the current node are determined. If the number of the occupied neighbours of the parent node is greater than or equal to a first threshold and the number of the occupied neighbours of the current node is greater than or equal to a second threshold, reconstructed attribute information of occupied neighbouring nodes of the current node and reconstructed attribute information of occupied same-level neighbouring child nodes of a child node of the current node are determined. An attribute prediction value of the child node of the current node is determined according to the reconstructed attribute information of the occupied neighbouring nodes and the reconstructed attribute information of the occupied same-level neighbouring child nodes of the child node of the current node. A first transformed coefficient is determined by performing RAHT on the attribute prediction value, and a coefficient residual value of the child node of the current node is determined according to the first transformed coefficient. The coefficient residual value is signalled into a bitstream.

Embodiments of the disclosure provide a point cloud decoding method, applied to a decoder and including: determining reconstructed attribute information of occupied neighbouring nodes of a current node and reconstructed attribute information of occupied same-level neighbouring child nodes of a child node of the current node; determining an attribute prediction value of the child node of the current node according to the reconstructed attribute information of the occupied neighbouring nodes and the reconstructed attribute information of the occupied same-level neighbouring child nodes of the child node of the current node; and determining a first transformed coefficient by performing region adaptive hierarchal transform (RAHT) on the attribute prediction value, and determining reconstructed attribute information of the child node of the current node according to the first transformed coefficient.

In embodiments of the disclosure, the occupied neighbouring nodes include: the current node and an occupied coplanar neighbouring node and an occupied collinear neighbouring node of the current node; and the occupied same-level neighbouring child nodes of the child node of the current node include: an occupied coplanar neighbouring node and an occupied collinear neighbouring node of the child node of the current node.

In embodiments of the disclosure, the method further includes: determining weights corresponding to the occupied neighbouring nodes and the occupied same-level neighbouring child nodes of the child node of the current node; and determining the attribute prediction value of the child node of the current node by weighting the reconstructed attribute information of the occupied neighbouring nodes and the reconstructed attribute information of the occupied same-level neighbouring child nodes of the child node of the current node according to the weights.

In embodiments of the disclosure, the method further includes: determining reference neighbouring nodes by filtering the occupied neighbouring nodes and the occupied same-level neighbouring child nodes of the child node of the current node; and determining the attribute prediction value of the child node of the current node according to reconstructed attribute information of the reference neighbouring nodes.

In embodiments of the disclosure, the method further includes: determining weights corresponding to the reference neighbouring nodes; and determining the attribute prediction value of the child node of the current node by weighting the reconstructed attribute information of the reference neighbouring nodes according to the weights.

In embodiments of the disclosure, the method further includes: determining a first preset threshold according to reconstructed attribute information of the current node; and determining the reference neighbouring nodes by filtering the occupied neighbouring nodes and the occupied same-level neighbouring child nodes of the child node of the current node according to the first preset threshold.

In embodiments of the disclosure, a number of occupied neighbouring nodes in the reference neighbouring nodes is less than or equal to a third threshold.

In embodiments of the disclosure, a number of occupied same-level neighbouring child nodes in the reference neighbouring nodes is less than or equal to a fourth threshold.

In embodiments of the disclosure, the weights include: a first weight corresponding to the current node, a second weight corresponding to the occupied coplanar neighbouring node of the current node, a third weight corresponding to the occupied collinear neighbouring node of the current node, a fourth weight corresponding to the occupied coplanar neighbouring node of the child node of the current node, and a fifth weight corresponding to the occupied collinear neighbouring node of the child node of the current node.

In embodiments of the disclosure, the method further includes: decoding a bitstream to determine a coefficient residual value of the child node of the current node; and determining a coefficient residual of the child node of the current node by performing inverse quantization on the coefficient residual value.

In embodiments of the disclosure, the method further includes: determining a second transformed coefficient of the child node of the current node according to the first transformed coefficient and the coefficient residual; and determining the reconstructed attribute information of the child node of the current node by performing inverse transform on the second transformed coefficient.

In embodiments of the disclosure, the occupied same-level neighbouring child nodes of the child node of the current node and the child node of the current node are same-level neighbouring nodes, and the same-level neighbouring nodes are nodes of a same size.

Embodiments of the disclosure provide a point cloud decoding method, applied to a decoder and including: determining a number of occupied neighbours of a parent node of a current node and a number of occupied neighbours of the current node, if the current node is not a root node; determining reconstructed attribute information of occupied neighbouring nodes of the current node and reconstructed attribute information of occupied same-level neighbouring child nodes of a child node of the current node, if the number of the occupied neighbours of the parent node is greater than or equal to a first threshold and the number of the occupied neighbours of the current node is greater than or equal to a second threshold; determining an attribute prediction value of the child node of the current node according to the reconstructed attribute information of the occupied neighbouring nodes and the reconstructed attribute information of the occupied same-level neighbouring child nodes of the child node of the current node; and determining a first transformed coefficient by performing region adaptive hierarchal transform (RAHT) on the attribute prediction value, and determining reconstructed attribute information of the child node of the current node according to the first transformed coefficient.

In embodiments of the disclosure, the method further includes: decoding a bitstream to determine a quantized coefficient of the current node, if the current node is the root node; determining a transformed coefficient by performing inverse quantization on the quantized coefficient; and determining reconstructed attribute information of the current node by performing inverse transform on the transformed coefficient.

In embodiments of the disclosure, the method further includes: decoding a bitstream to determine a quantized coefficient of the current node, if the number of the occupied neighbours of the parent node is less than the first threshold or the number of the occupied neighbours of the current node is less than the second threshold; determining a transformed coefficient by performing inverse quantization on the quantized coefficient; and determining reconstructed attribute information of the current node by performing inverse transform on the transformed coefficient.

Embodiments of the disclosure provide a point cloud encoding method, applied to an encoder and including: determining reconstructed attribute information of occupied neighbouring nodes of a current node and reconstructed attribute information of occupied same-level neighbouring child nodes of a child node of the current node; determining an attribute prediction value of the child node of the current node according to the reconstructed attribute information of the occupied neighbouring nodes and the reconstructed attribute information of the occupied same-level neighbouring child nodes of the child node of the current node; determining a first transformed coefficient by performing region adaptive hierarchal transform (RAHT) on the attribute prediction value, and determining a coefficient residual value of the child node of the current node according to the first transformed coefficient; and signalling the coefficient residual value into a bitstream.

In embodiments of the disclosure, the occupied neighbouring nodes include: the current node and an occupied coplanar neighbouring node and an occupied collinear neighbouring node of the current node; and the occupied same-level neighbouring child nodes of the child node of the current node include: an occupied coplanar neighbouring node and an occupied collinear neighbouring node of the child node of the current node.

In embodiments of the disclosure, the method further includes: determining weights corresponding to the occupied neighbouring nodes and the occupied same-level neighbouring child nodes of the child node of the current node; and determining the attribute prediction value of the child node of the current node by weighting the reconstructed attribute information of the occupied neighbouring nodes and the reconstructed attribute information of the occupied same-level neighbouring child nodes of the child node of the current node according to the weights.

In embodiments of the disclosure, the method further includes: determining reference neighbouring nodes by filtering the occupied neighbouring nodes and the occupied same-level neighbouring child nodes of the child node of the current node; and determining the attribute prediction value of the child node of the current node according to reconstructed attribute information of the reference neighbouring nodes.

In embodiments of the disclosure, the method further includes: determining weights corresponding to the reference neighbouring nodes; and determining the attribute prediction value of the child node of the current node by weighting the reconstructed attribute information of the reference neighbouring nodes according to the weights.

In embodiments of the disclosure, the method further includes: determining a first prediction threshold and a second prediction threshold according to reconstructed attribute information of the current node; and determining the reference neighbouring nodes by filtering the occupied neighbouring nodes and the occupied same-level neighbouring child nodes of the child node of the current node according to the first prediction threshold and the second prediction threshold.

In embodiments of the disclosure, a number of occupied neighbouring nodes in the reference neighbouring nodes is less than or equal to a third threshold.

In embodiments of the disclosure, a number of occupied same-level neighbouring child nodes in the reference neighbouring nodes is less than or equal to a fourth threshold.

In embodiments of the disclosure, the weights include: a first weight corresponding to the current node, a second weight corresponding to the occupied coplanar neighbouring node of the current node, a third weight corresponding to the occupied collinear neighbouring node of the current node, a fourth weight corresponding to the occupied coplanar neighbouring node of the child node of the current node, and a fifth weight corresponding to the occupied collinear neighbouring node of the child node of the current node.

In embodiments of the disclosure, the method further includes: determining a second transformed coefficient by performing RAHT on original attribute information of the child node of the current node; determining a coefficient residual between the first transformed coefficient and the second transformed coefficient; and determining the coefficient residual value by quantizing the coefficient residual.

In embodiments of the disclosure, the occupied same-level neighbouring child nodes of the child node of the current node and the child node of the current node are same-level neighbouring nodes, and the same-level neighbouring nodes are nodes of a same size.

Embodiments of the disclosure provide a point cloud encoding method, applied to an encoder and including: determining a number of occupied neighbours of a parent node of a current node and a number of occupied neighbours of the current node, if the current node is not a root node; determining reconstructed attribute information of occupied neighbouring nodes of the current node and reconstructed attribute information of occupied same-level neighbouring child nodes of a child node of the current node, if the number of the occupied neighbours of the parent node is greater than or equal to a first threshold and the number of the occupied neighbours of the current node is greater than or equal to a second threshold; determining an attribute prediction value of the child node of the current node according to the reconstructed attribute information of the occupied neighbouring nodes and the reconstructed attribute information of the occupied same-level neighbouring child nodes of the child node of the current node; determining a first transformed coefficient by performing region adaptive hierarchal transform (RAHT) on the attribute prediction value, and determining a coefficient residual value of the child node of the current node according to the first transformed coefficient; and signalling the coefficient residual value into a bitstream.

In embodiments of the disclosure, the method further includes: determining a transformed coefficient by performing RAHT on reconstructed attribute information of the current node, if the current node is the root node; determining a quantized coefficient by quantizing the transformed coefficient; and signalling the quantized coefficient into the bitstream.

In embodiments of the disclosure, the method further includes: determining a transformed coefficient by performing RAHT on reconstructed attribute information of the current node, if the number of the occupied neighbours of the parent node is less than the first threshold or the number of the occupied neighbours of the current node is less than the second threshold; determining a quantized coefficient by quantizing the transformed coefficient; and signalling the quantized coefficient into the bitstream.

Embodiments of the disclosure provide a decoder, including: a first determining part configured to determine reconstructed attribute information of occupied neighbouring nodes of a current node and reconstructed attribute information of occupied same-level neighbouring child nodes of a child node of the current node; determine an attribute prediction value of the child node of the current node according to the reconstructed attribute information of the occupied neighbouring nodes and the reconstructed attribute information of the occupied same-level neighbouring child nodes of the child node of the current node; and determine a first transformed coefficient by performing region adaptive hierarchal transform (RAHT) on the attribute prediction value, and determine reconstructed attribute information of the child node of the current node according to the first transformed coefficient.

Embodiments of the disclosure provide a decoder, including: a first determining part configured to determine a number of occupied neighbours of a parent node of a current node and a number of occupied neighbours of the current node, if the current node is not a root node; determine reconstructed attribute information of occupied neighbouring nodes of the current node and reconstructed attribute information of occupied same-level neighbouring child nodes of a child node of the current node, if the number of the occupied neighbours of the parent node is greater than or equal to a first threshold and the number of the occupied neighbours of the current node is greater than or equal to a second threshold; determine an attribute prediction value of the child node of the current node according to the reconstructed attribute information of the occupied neighbouring nodes and the reconstructed attribute information of the occupied same-level neighbouring child nodes of the child node of the current node; and determine a first transformed coefficient by performing region adaptive hierarchal transform (RAHT) on the attribute prediction value, and determine reconstructed attribute information of the child node of the current node according to the first transformed coefficient.

Embodiments of the disclosure provide a decoder, including a first processor and a first memory storing instructions executable by the first processor, which when executed by the first processor, are operable to implement any of the point cloud decoding method above.

Embodiments of the disclosure provide an encoder, including: a second determining part configured to determine reconstructed attribute information of occupied neighbouring nodes of a current node and reconstructed attribute information of occupied same-level neighbouring child nodes of a child node of the current node; determine an attribute prediction value of the child node of the current node according to the reconstructed attribute information of the occupied neighbouring nodes and the reconstructed attribute information of the occupied same-level neighbouring child nodes of the child node of the current node; and determine a first transformed coefficient by performing region adaptive hierarchal transform (RAHT) on the attribute prediction value, and determine a coefficient residual value of the child node of the current node according to the first transformed coefficient; and an encoding part configured to signal the coefficient residual value into a bitstream.

Embodiments of the disclosure provide an encoder, including: a second determining part configured to determine a number of occupied neighbours of a parent node of a current node and a number of occupied neighbours of the current node, if the current node is not a root node; determine reconstructed attribute information of occupied neighbouring nodes of the current node and reconstructed attribute information of occupied same-level neighbouring child nodes of a child node of the current node, if the number of the occupied neighbours of the parent node is greater than or equal to a first threshold and the number of the occupied neighbours of the current node is greater than or equal to a second threshold; determine an attribute prediction value of the child node of the current node according to the reconstructed attribute information of the occupied neighbouring nodes and the reconstructed attribute information of the occupied same-level neighbouring child nodes of the child node of the current node; and determine a first transformed coefficient by performing region adaptive hierarchal transform (RAHT) on the attribute prediction value, and determine a coefficient residual value of the child node of the current node according to the first transformed coefficient; and an encoding part configured to signal the coefficient residual value into a bitstream.

Embodiments of the disclosure provide an encoder, including a second processor and a second memory storing instructions executable by the second processor, which when executed by the second processor, are operable to implement any of the point cloud encoding method above.

Embodiments of the disclosure provide a computer storage medium storing a computer program which, when executed by a first processor, is operable to implement any of the point cloud decoding method above, or when executed by a second processor, is operable to implement any of the point cloud encoding method above.

It may be noted that in embodiments of the disclosure, the terms "including", "comprising" or any other variant thereof are intended to cover non-exclusive inclusion, such that a process, method, article or apparatus comprising a range of elements includes not only those elements, but also includes other elements that are not explicitly listed or are also inherent to such a process, method, article or device. Without further limitation, an element qualified by the statement "including a . . ." does not preclude the existence of another identical element in the process, method, article or apparatus including that element.

The above serial numbers of the embodiments of the disclosure are for descriptive purposes only and do not represent the merits of the embodiments.

The methods disclosed in the several method embodiments provided in this disclosure may be combined in any way to obtain new method embodiments without conflict.

The features disclosed in the several product embodiments provided in this disclosure may be combined in any way to obtain new product embodiments without conflict.

The features disclosed in several method or apparatus embodiments provided in this disclosure may be combined in any way to obtain new method embodiments or apparatus embodiments without conflict.

The foregoing is only a specific implementation of the present disclosure, but the scope of protection of the present disclosure is not limited thereto, and any variation or substitution readily conceivable by any person skilled in the art within the technical scope disclosed in the present disclosure shall be covered by the scope of protection of the present disclosure. Accordingly, the scope of protection of this disclosure shall be governed by the scope of protection of the stated claims.

INDUSTRIAL APPLICABILITY

A point cloud coding method, a codec, and a computer storage medium are disclosed in embodiments of the disclosure. A decoder determines reconstructed attribute information of occupied neighbouring nodes of a current node and reconstructed attribute information of occupied same-level neighbouring child nodes of a child node of the current node. The decoder determines an attribute prediction value of the child node of the current node according to the reconstructed attribute information of the occupied neighbouring nodes and the reconstructed attribute information of the occupied same-level neighbouring child nodes of the child node of the current node. The decoder determines a first transformed coefficient by performing RAHT on the attribute prediction value, and determines reconstructed attribute information of the child node of the current node according to the first transformed coefficient. An encoder determines reconstructed attribute information of occupied neighbouring nodes of a current node and reconstructed attribute information of occupied same-level neighbouring child nodes of a child node of the current node. The encoder determines an attribute prediction value of the child node of the current node according to the reconstructed attribute information of the occupied neighbouring nodes and the reconstructed attribute information of the occupied same-level neighbouring child nodes of the child node of the current node. The encoder determines a first transformed coefficient by performing RAHT on the attribute prediction value, and determines a quantized coefficient residual of the child node of the current node according to the first transformed coefficient. The encoder signals the quantized coefficient residual into a bitstream. That is to say, in embodiments of the disclosure, for the RAHT process, during prediction of attribute information of the current node, the reconstructed attribute information of the occupied neighbouring nodes of the current node and the reconstructed attribute information of the occupied same-level neighbouring child nodes of the child node of the current node can be used to determine the attribute prediction value of the child node of the current node. In other words, on the basis of upsampled prediction, same-level neighbouring nodes of the current node and same-level neighbouring child nodes of the child node are introduced for prediction of the attribute information, that is, parent-level neighbouring nodes and the same-level neighbouring child nodes of the child node of the current node are introduced for prediction of the attribute information. As such, the coding efficiency and the video compression performance can be improved.

What is claimed is:

1. A point cloud decoding method, applied to a decoder and comprising:
determining reconstructed attribute information of occupied neighbouring nodes of a current node and reconstructed attribute information of occupied same-level neighbouring child nodes of a child node of the current node;
determining an attribute prediction value of the child node of the current node according to the reconstructed attribute information of the occupied neighbouring nodes and the reconstructed attribute information of the occupied same-level neighbouring child nodes of the child node of the current node; and
determining a first transformed coefficient by performing region adaptive hierarchal transform (RAHT) on the attribute prediction value, and determining reconstructed attribute information of the child node of the current node according to the first transformed coefficient.

2. The method of claim 1, wherein
the occupied neighbouring nodes comprise: the current node and an occupied coplanar neighbouring node and an occupied collinear neighbouring node of the current node; and
the occupied same-level neighbouring child nodes of the child node of the current node comprise: an occupied coplanar neighbouring node and an occupied collinear neighbouring node of the child node of the current node.

3. The method of claim 2, further comprising:
determining weights corresponding to the occupied neighbouring nodes and the occupied same-level neighbouring child nodes of the child node of the current node; and
determining the attribute prediction value of the child node of the current node by weighting the reconstructed attribute information of the occupied neighbouring nodes and the reconstructed attribute information of the occupied same-level neighbouring child nodes of the child node of the current node according to the weights.

4. The method of claim 2, further comprising:
determining reference neighbouring nodes by filtering the occupied neighbouring nodes and the occupied same-level neighbouring child nodes of the child node of the current node; and
determining the attribute prediction value of the child node of the current node according to reconstructed attribute information of the reference neighbouring nodes.

5. The method of claim 4, further comprising:
determining weights corresponding to the reference neighbouring nodes; and
determining the attribute prediction value of the child node of the current node by weighting the reconstructed attribute information of the reference neighbouring nodes according to the weights.

6. The method of claim 4, further comprising:
determining a first preset threshold according to reconstructed attribute information of the current node; and
determining the reference neighbouring nodes by filtering the occupied neighbouring nodes and the occupied same-level neighbouring child nodes of the child node of the current node according to the first preset threshold.

7. The method of claim 3, wherein the weights comprise: a first weight corresponding to the current node, a second weight corresponding to the occupied coplanar neighbouring node of the current node, a third weight corresponding to the occupied collinear neighbouring node of the current node, a fourth weight corresponding to the occupied coplanar neighbouring node of the child node of the current node, and a fifth weight corresponding to the occupied collinear neighbouring node of the child node of the current node.

8. The method of claim 1, further comprising:

decoding a bitstream to determine a coefficient residual value of the child node of the current node;

determining a coefficient residual of the child node of the current node by performing inverse quantization on the coefficient residual value;

determining a second transformed coefficient of the child node of the current node according to the first transformed coefficient and the coefficient residual; and determining the reconstructed attribute information of the child node of the current node by performing inverse transform on the second transformed coefficient.

9. The method of claim 1, wherein the occupied same-level neighbouring child nodes of the child node of the current node and the child node of the current node are same-level neighbouring nodes, and the same-level neighbouring nodes are nodes of a same size.

10. A point cloud decoding method, applied to a decoder and comprising:

determining a number of occupied neighbours of a parent node of a current node and a number of occupied neighbours of the current node, if the current node is not a root node;

determining reconstructed attribute information of occupied neighbouring nodes of the current node and reconstructed attribute information of occupied same-level neighbouring child nodes of a child node of the current node, if the number of the occupied neighbours of the parent node is greater than or equal to a first threshold and the number of the occupied neighbours of the current node is greater than or equal to a second threshold;

determining an attribute prediction value of the child node of the current node according to the reconstructed attribute information of the occupied neighbouring nodes and the reconstructed attribute information of the occupied same-level neighbouring child nodes of the child node of the current node; and determining a first transformed coefficient by performing region adaptive hierarchal transform (RAHT) on the attribute prediction value, and determining reconstructed attribute information of the child node of the current node according to the first transformed coefficient.

11. The method of claim 10, further comprising:

decoding a bitstream to determine a quantized coefficient of the current node, if the current node is the root node;

determining a transformed coefficient by performing inverse quantization on the quantized coefficient; and determining reconstructed attribute information of the current node by performing inverse transform on the transformed coefficient.

12. The method of claim 10, further comprising:

decoding a bitstream to determine a quantized coefficient of the current node, if the number of the occupied neighbours of the parent node is less than the first threshold or the number of the occupied neighbours of the current node is less than the second threshold;

determining a transformed coefficient by performing inverse quantization on the quantized coefficient; and determining reconstructed attribute information of the current node by performing inverse transform on the transformed coefficient.

13. A point cloud encoding method, applied to an encoder and comprising:

determining reconstructed attribute information of occupied neighbouring nodes of a current node and reconstructed attribute information of occupied same-level neighbouring child nodes of a child node of the current node;

determining an attribute prediction value of the child node of the current node according to the reconstructed attribute information of the occupied neighbouring nodes and the reconstructed attribute information of the occupied same-level neighbouring child nodes of the child node of the current node;

determining a first transformed coefficient by performing region adaptive hierarchal transform (RAHT) on the attribute prediction value, and determining a coefficient residual value of the child node of the current node according to the first transformed coefficient; and signalling the coefficient residual value into a bitstream.

14. The method of claim 13, wherein the occupied neighbouring nodes comprise: the current node and an occupied coplanar neighbouring node and an occupied collinear neighbouring node of the current node; and the occupied same-level neighbouring child nodes of the child node of the current node comprise: an occupied coplanar neighbouring node and an occupied collinear neighbouring node of the child node of the current node.

15. The method of claim 14, further comprising:

determining weights corresponding to the occupied neighbouring nodes and the occupied same-level neighbouring child nodes of the child node of the current node; and determining the attribute prediction value of the child node of the current node by weighting the reconstructed attribute information of the occupied neighbouring nodes and the reconstructed attribute information of the occupied same-level neighbouring child nodes of the child node of the current node according to the weights.

16. The method of claim 14, further comprising:

determining reference neighbouring nodes by filtering the occupied neighbouring nodes and the occupied same-level neighbouring child nodes of the child node of the current node; and determining the attribute prediction value of the child node of the current node according to reconstructed attribute information of the reference neighbouring nodes.

17. The method of claim 16, further comprising:

determining weights corresponding to the reference neighbouring nodes; and determining the attribute prediction value of the child node of the current node by weighting the reconstructed attribute information of the reference neighbouring nodes according to the weights.

18. The method of claim 16, further comprising:

determining a first prediction threshold and a second prediction threshold according to reconstructed attribute information of the current node; and determining the reference neighbouring nodes by filtering the occupied neighbouring nodes and the occupied same-level neighbouring child nodes of the child node of the current node according to the first prediction threshold and the second prediction threshold.

19. The method of claim 15, wherein the weights comprise: a first weight corresponding to the current node, a second weight corresponding to the occupied coplanar neighbouring node of the current node, a third weight corresponding to the occupied collinear neighbouring node of the current node, a fourth weight corresponding to the occupied coplanar neighbouring node of the child node of the current node, and a fifth weight corresponding to the occupied collinear neighbouring node of the child node of the current node.

20. The method of claim 13, further comprising:

determining a second transformed coefficient by performing RAHT on original attribute information of the child node of the current node;

determining a coefficient residual between the first transformed coefficient and the second transformed coefficient; and determining the coefficient residual value by quantizing the coefficient residual.

* * * * *

50